US012618392B2

(12) United States Patent
Rudd

(10) Patent No.: US 12,618,392 B2
(45) Date of Patent: May 5, 2026

(54) COMMUNICATING FLUID VESSEL ENGINE SYSTEMS

(71) Applicant: James D. Rudd, Key Largo, FL (US)

(72) Inventor: James D. Rudd, Key Largo, FL (US)

( * ) Notice: Subject to any disclaimer, the term of this patent is extended or adjusted under 35 U.S.C. 154(b) by 0 days.

(21) Appl. No.: 18/964,202

(22) Filed: Nov. 29, 2024

(65) Prior Publication Data

US 2025/0092860 A1 Mar. 20, 2025

Related U.S. Application Data

(63) Continuation-in-part of application No. 18/766,314, filed on Jul. 8, 2024, now Pat. No. 12,372,066, which is a continuation of application No. 18/273,712, filed as application No. PCT/US2022/014516 on Jan. 31, 2022, now Pat. No. 12,037,988.

(60) Provisional application No. 63/144,729, filed on Feb. 2, 2021.

(51) Int. Cl.
| *F03B 17/02* | (2006.01) |
| *F01D 15/10* | (2006.01) |
| *F03B 17/04* | (2006.01) |
| *F03B 17/06* | (2006.01) |
| *F03G 3/00* | (2006.01) |
| *F03G 7/08* | (2006.01) |
| *F03G 7/10* | (2006.01) |

(52) U.S. Cl.
CPC ............ *F03B 17/025* (2013.01); *F01D 15/10* (2013.01); *F03B 17/04* (2013.01); *F03B 17/06* (2013.01); *F03G 3/096* (2021.08); *F03G 7/08* (2013.01); *F03G 7/104* (2021.08); *F03G 7/107* (2021.08); *F05D 2220/76* (2013.01)

(58) Field of Classification Search
CPC ........ F01D 15/10; F03B 17/025; F03B 17/04; F03B 17/06; F03G 3/06; F03G 3/096; F03G 7/08; F03G 7/104; F03G 7/107; F05D 2220/76
See application file for complete search history.

(56) References Cited

U.S. PATENT DOCUMENTS

| 2,239,064 A | * | 4/1941 | Tower | F03B 17/02 |
| | | | | 60/640 |
| 5,671,602 A | * | 9/1997 | Hashimoto | F03G 7/10 |
| | | | | 60/721 |
| 6,042,342 A | * | 3/2000 | Orian | F04F 1/06 |
| | | | | 417/208 |

(Continued)

*Primary Examiner* — Matthew Wiblin
(74) *Attorney, Agent, or Firm* — HAYES SOLOWAY P.C.

(57) ABSTRACT

The engine system with communicating fluid vessels has first, second, and third fluid containers each containing a fluid. At least one interconnecting lever conduit contains the fluid and is rotatably coupled to the first, second, and third fluid containers. The interconnecting lever conduit is pivotal about an axis and defines a fluid passageway by which the first, second, and third fluid containers are in fluid communication. At least one buoyant member and at least one holding tank are positioned in each of the first and third fluid containers. A tether is physically linking together the holding tank of each of the first and third fluid containers. Supplying the gas to the interior of the holding tank displaces at least some of the fluid from the interior of the holding tank to increase a column height of the fluid in each of the first, second, and third fluid containers.

36 Claims, 29 Drawing Sheets

(56) References Cited

U.S. PATENT DOCUMENTS

| | | | | |
|---|---|---|---|---|
| 6,115,950 | A * | 9/2000 | Al-Mutairi | F03B 17/04 |
| | | | | 40/406 |
| 9,234,495 | B2 | 1/2016 | Anteau | |
| 2003/0214135 | A1* | 11/2003 | Peloquin | F03B 17/025 |
| | | | | 290/54 |
| 2006/0168953 | A1 | 8/2006 | Carter | |
| 2011/0108362 | A1* | 5/2011 | Gorney | F03G 7/10 |
| | | | | 74/DIG. 9 |
| 2024/0093674 | A1 | 3/2024 | Rudd | |

* cited by examiner

300

312

340

334

330

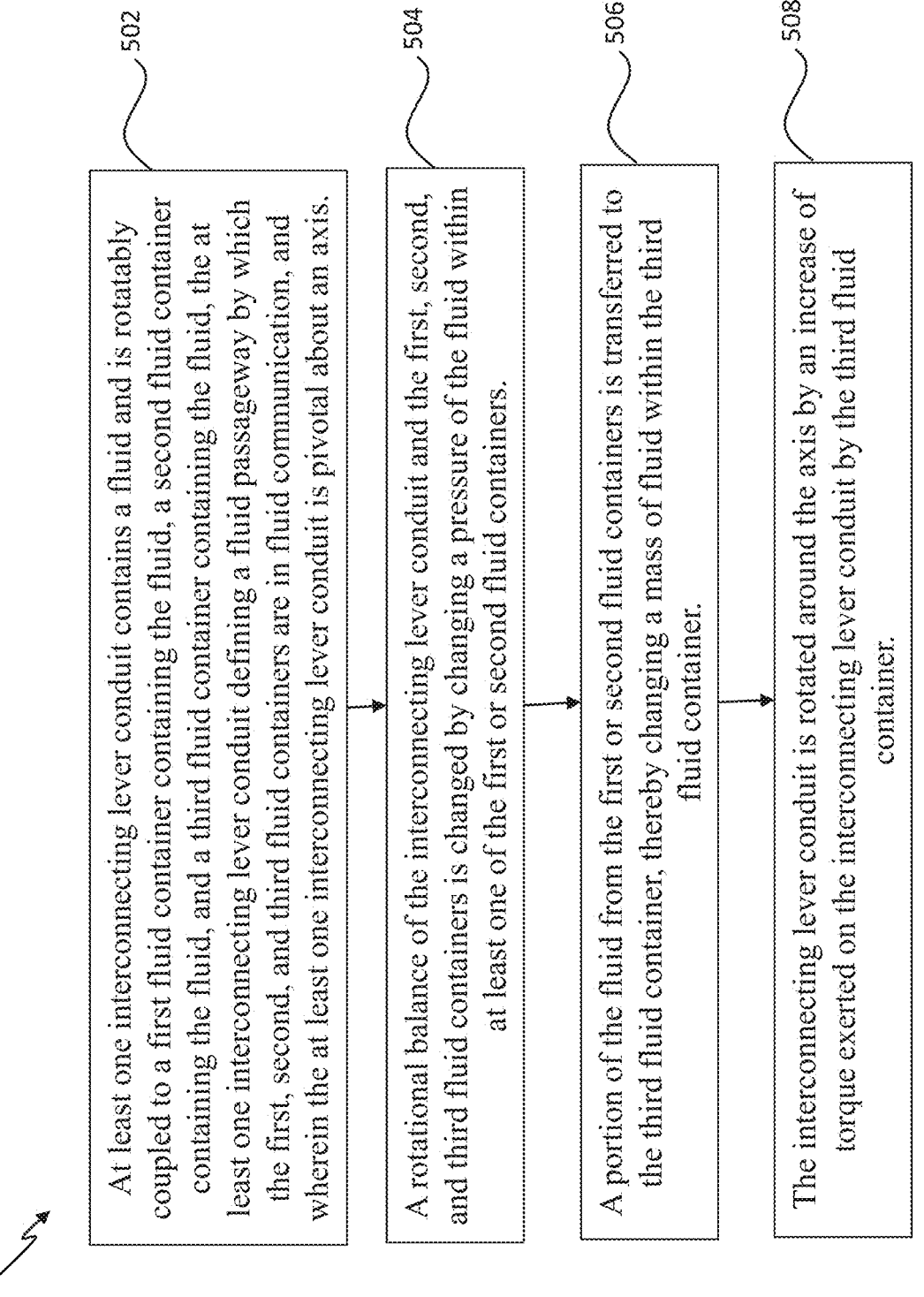

502

At least one interconnecting lever conduit contains a fluid and is rotatably coupled to a first fluid container containing the fluid, a second fluid container containing the fluid, and a third fluid container containing the fluid, the at least one interconnecting lever conduit defining a fluid passageway by which the first, second, and third fluid containers are in fluid communication, and wherein the at least one interconnecting lever conduit is pivotal about an axis.

504

A rotational balance of the interconnecting lever conduit and the first, second, and third fluid containers is changed by changing a pressure of the fluid within at least one of the first or second fluid containers.

506

A portion of the fluid from the first or second fluid containers is transferred to the third fluid container, thereby changing a mass of fluid within the third fluid container.

508

The interconnecting lever conduit is rotated around the axis by an increase of torque exerted on the interconnecting lever conduit by the third fluid container.

COMMUNICATING FLUID VESSEL ENGINE SYSTEMS

CROSS REFERENCE TO RELATED APPLICATION

This application is a continuation-in-part of U.S. application Ser. No. 18/766,314 filed Jul. 8, 2024, which itself is a continuation of U.S. application Ser. No. 18/273,712 filed Jul. 21, 2023, which is a National Stage Application Under 35 USC § 371 and claims the benefit of International Application No. PCT/US2022/014516 filed Jan. 31, 2022, which claims the benefit of U.S. Provisional Application Ser. No. 63/144,729, filed Feb. 2, 2021, the entire disclosures of which are incorporated herein by reference.

FIELD OF THE DISCLOSURE

This disclosure relates to systems that produce motion that can be harnessed for useful purposes, such as to generate electricity. For example, this disclosure relates to a communicating fluid vessel system that moves a lever that can drive an electrical generator. The communicating fluid vessel system utilizes changes in the volume, and thereby the weight, of a column of fluid that results from changing the displacement of a fluid in an adjacent communicating column of fluid.

BACKGROUND OF THE DISCLOSURE

Humans have become addicted to fossil fuels for transportation, heat, and to generate power. It is well documented that carbon levels in the atmosphere have been increasing steadily, leading to global warming and the resulting climate change. It is also well documented that the leading cause of carbon level rise is the creation of energy using fossil fuels.

In developed countries, electricity from fossil fuel is cheap and readily available, providing a disincentive to switch to alternative fuel sources. However, the size and complexity of the facility needed for fossil fuel burning energy plants to produce enough electricity prevents such an energy production source from being readily available in poor and underdeveloped countries. These countries suffer from an energy shortage.

Renewable energies such as solar power, wind turbine, and hydroelectric energy alternatives are known in the art. However, these alternatives suffer from the disadvantage that they are still relatively inefficient, expensive to build, and often require specific climate conditions such as wind, rainfall, snowmelt or the like to produce electricity. Such conditions are not readily available throughout the world.

Thus, a heretofore unaddressed need exists in the industry to address the aforementioned deficiencies and inadequacies.

SUMMARY OF THE DISCLOSURE

Embodiments of the present disclosure provide an engine system with communicating fluid vessels. Briefly described, in architecture, one embodiment of the system, among others, can be implemented as follows. The engine system with communicating fluid vessels has a first fluid container containing a fluid, a second fluid container containing the fluid, and a third fluid container containing the fluid. At least one interconnecting lever conduit contains the fluid and is rotatably coupled to the first, second, and third fluid containers. The at least one interconnecting lever conduit defines a fluid passageway by which the first, second, and third fluid containers are in fluid communication. The at least one interconnecting lever conduit is pivotal about an axis. At least one buoyant member is positioned in each of the first and third fluid containers. At least one holding tank is positioned in each of the first and third fluid containers and connected to the at least one buoyant member. The at least one holding tank has: (i) a lower portion configured to allow the fluid to pass into and out of an interior of the holding tank and (ii) an upper portion that is fluidly sealed. A tether is physically linking together the holding tank of each of the first and third fluid containers. A supply of a gas is in fluid communication with the interior of at least one of the holding tanks in the first or third fluid containers. Supplying the gas to the interior of the holding tank displaces at least some of the fluid from the interior of the holding tank to increase a column height of the fluid in each of the first, second, and third fluid containers.

The present disclosure can also be viewed as providing an engine system with communicating fluid vessels. Briefly described, in architecture, one embodiment of the system, among others, can be implemented as follows. The engine system with communicating fluid vessels has an output shaft and two or more engines. Each of the two or more engines comprises: a first fluid container containing a fluid; a second fluid container containing the fluid; a third fluid container containing the fluid; at least one interconnecting lever conduit containing the fluid and rotatably coupled to the first, second, and third fluid containers, the at least one interconnecting lever conduit defining a fluid passageway by which the first, second, and third fluid containers are in fluid communication, and wherein the at least one interconnecting lever conduit is pivotal about an axis; at least one buoyant member positioned in each of the first and third fluid containers; at least one holding tank positioned in each of the first and third fluid containers and connected to the at least one buoyant member, the at least one holding tank having: (i) a lower portion configured to allow the fluid to pass into and out of an interior of the holding tank and (ii) an upper portion that is fluidly sealed; a tether physically linking together the holding tank of each of the first and third fluid containers; and a supply of a gas that is in fluid communication with the interior of at least one of the holding tanks in the first or third fluid containers, wherein supplying the gas to the interior of the holding tank displaces at least some of the fluid from the interior of the holding tank to increase a column height of the fluid in each of the first, second, and third fluid containers. The two or more engines are each coupled to and drive rotations of the output shaft.

The present disclosure can also be viewed as providing methods using an engine system with communicating fluid vessels. In this regard, one embodiment of such a method, among others, can be broadly summarized by the following steps: providing at least one interconnecting lever conduit containing a fluid and rotatably coupled to a first fluid container containing the fluid, a second fluid container containing the fluid, and a third fluid container containing the fluid, the at least one interconnecting lever conduit defining a fluid passageway by which the first, second, and third fluid containers are in fluid communication, and wherein the at least one interconnecting lever conduit is pivotal about an axis; changing a rotational balance of the interconnecting lever conduit and the first, second, and third fluid containers by changing a pressure of the fluid within at least one of the first or third fluid containers; transferring a portion of the fluid from the first or third fluid containers to the second fluid container, thereby changing a mass of fluid within the second fluid container; and rotating the interconnecting lever conduit around the axis by an increase of torque exerted on the interconnecting lever conduit by the second fluid container.

As will be described herein, the disclosed systems and methods use at least one communicating vessel with at least one lever, which are formed as a rotationally balanced structure. Changes in fluid pressure are used to shift fluid mass to a communicating vessel positioned at the end of the lever when the lever is at the top of its rotation, and also uses changes in fluid pressure to shift fluid mass away from the communicating vessel at the end of the lever when the lever reaches the bottom of its rotation.

To change the fluid pressure in the communicating vessel, work is introduced into the system, which is denoted as Work Input. For instance, a fluid or gas pump can be used to introduce Work Input. The pump may be used to move a low-density fluid, e.g. air or another gas, into a holding tank to displace a volume of fluid at or near the surface in one or more of fluid columns of the communicating vessel to increase the surrounding fluid pressure. The now higher-pressure fluid area pushes toward the lower-pressure areas until the pressure at every point within the fluid becomes equal at a given depth. At equilibrium, additional fluid mass (in the form of fluid molecules) are shifted to the bottom of the lower-pressure fluid column. This additional fluid mass is denoted as Vbottom.

When it is assumed that the lower pressure fluid column is positioned at the end of the lever, and the structure of the system being rotationally balanced at the outset, the additional fluid mass, Vbottom, upsets the rotational balance and rotates the side with the greatest weight of the lever downward. When the side of the lever reaches a bottom position, e.g., at the bottom of the rotational path, low-density fluid or air can be drained from the holding tank. This causes the additional fluid mass to shift back to its starting position, which in turn returns the system back into a rotationally balanced structure again.

Generally, the fluid columns in a communicating vessel are vertical in nature, and therefore adding additional fluid mass to the bottom of a lower-pressure fluid column by Work Input, can make available the gravitational potential energy (GPE) of an equal volume of fluid mass at any height within the fluid column. Reconfiguring the communicating vessel/lever system to use the fluid mass with the greatest GPE, e.g., the fluid mass at the greatest possible height, increases the possible Work Output of the device. Increasing the starting fluid column heights in the communicating vessel, and adjusting the communicating vessel/lever system to take advantage of this increased height, will continue to increase the possible Work Output of the device.

Other systems, methods, features, and advantages of the present disclosure will be or become apparent to one with skill in the art upon examination of the following drawings and detailed description. It is intended that all such additional systems, methods, features, and advantages be included within this description, be within the scope of present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. As such, many of the components of the drawings are shown not necessarily shown to scale in order to provide clarity of disclosure. Moreover, in the drawings, like reference numerals designate corresponding parts throughout the several views.

FIG. 25 is a flowchart illustrating a method using an engine system with communicating fluid vessels, in accordance with embodiments of the present disclosure.

DETAILED DESCRIPTION

The engine systems disclosed in this document operate using at least two scientific principles in general. The first principle is that of a lever. A lever is a simple machine that takes a small amount of force over a long distance and converts it to a large amount of force over a short distance. The second principle is based upon a communicating fluid vessel system. A communicating fluid vessel system includes two or more containers that are fluidly connected at or near their bottoms, that are open to the atmosphere, and that contain a homogeneous fluid.

The nature of a communicating fluid vessel system is that the surface of each fluid column maintains an equal elevation with all other fluid columns of the system. This is a result of nature's propensity to equalize the fluid pressure at common elevations among the fluid columns. Since the fluid pressure of a fluid column open at the top to the atmosphere is linearly proportional to the depth at that point from the surface, a communicating vessel system can remain stable only when the pressure at all elevations of the fluid columns are the same. This also means that the elevation of the top surface of each fluid column within the system is the same.

In the series of figures provided by this disclosure, components of the communicating fluid vessel system described herein are introduced and explained in a gradual manner in order to help the reader gain a clear understanding of each portion of the system. For example, some of the initial figures show only portions of the system in a schematic manner, and then later figures show other portions and the overall system. In addition, some of the figures show particular portions of the system in detail while other portions of the system are excluded from those figures. Accordingly, in such a case the reader can gain an understanding specifically about those particular portions of the system. These techniques for explaining the systems disclosed herein are used to help the reader understand each portion of the systems, and to understand the structure and operation of the overall systems.

Figure 1:
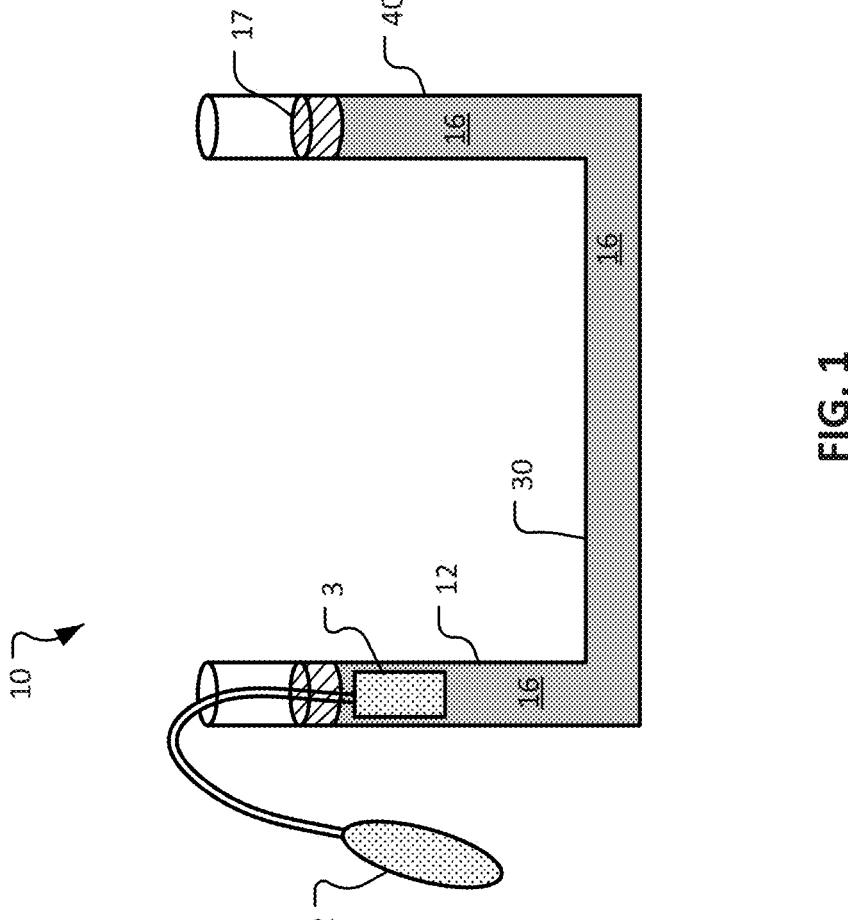
FIG. 1 is a schematic illustration showing, in general, a front view of an example communicating vessel system.

FIG. 1 schematically shows an example communicating fluid vessel system 10 (or simply "system 10") containing a fluid 16. The system 10 includes a fixed container 12, an outer container 40, and an interconnecting conduit 30. The interconnecting conduit 30 fluidly connects the fixed container 12 to the outer container 40.

Work can be added to the system 10, e.g., by squeezing a bulb or ball 2 to move, by way of a hose, air into a bladder 3 that is held just under the surface of the fluid within the fluid column of the fixed container 12. As the bladder 3 expands, fluid in the system 10 is displaced. Note that the ball 2, hose and bladder 3 are for illustrative purposes only, and are not necessarily part of the invention. The displacement of some of the fluid 16 from the expansion of the bladder 3 increases the fluid column height in the fixed container 12, and by virtue of the interconnecting conduit 30, shifts (displaces) an additional volume 17 of the fluid 16 (with its additional fluid mass) to a higher position, with this process successively repeating until there is an additional fluid 17 mass at the top of previously existing fluid column in the outer container 40. This additional fluid 17 is also referred to herein as an additional volume of fluid 17, new fluid mass 17, or Vadditional 17.

To provide clarity in disclosure, it is noted that the successive shifting of the fluid 16 in the communication vessel may be analogized to shifting links of a chain, with each link shifting a short distance toward the lower pressure fluid column. Vadditional 17 is understood as the fluid mass represented by the top link in the fluid column before any Work Input. After Work Input, Vadditional 17 may be understood being represented by the top link lifted a short distance to a higher elevation. Due to a new fluid volume filled in at the bottom of the fluid column, represented as new link of the chain at the bottom, the overall fluid column is now an additional fluid volume (Vadditional 17) taller, represented by an additional chain link in the height in the column, despite the movement to achieve Vadditional 17 at the top of the fluid column only requiring the work needed to move a single chain link.

The work added to expand the bladder 3 is approximately proportional to the amount of new fluid mass 17 shifted (displaced) to the top of the fluid column in the outer container 40. Moreover, the work added to increase the fluid column height in the outer container 40 is independent of the starting fluid column height in the system 10 (as long as the depth of the bladder 3 below the surface of the fluid 16 in the fixed container 12 remains the same). The reverse is also true. That is, contracting the bladder 3 equally decreases the fluid column heights in the fixed container 12 and the outer container 40, independent of the starting fluid column height in the system 10.

Figure 2:
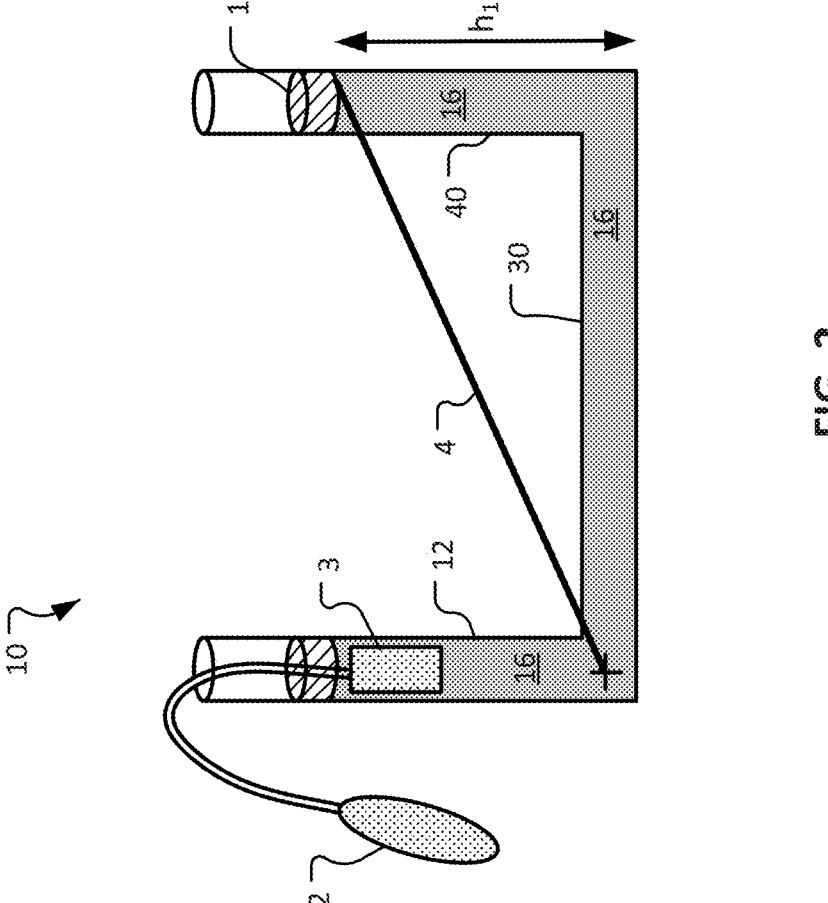
FIG. 2 is an illustration which shows the set of communicating vessels of FIG. 1 with an example lever overlaying the illustration.
Figure 3:
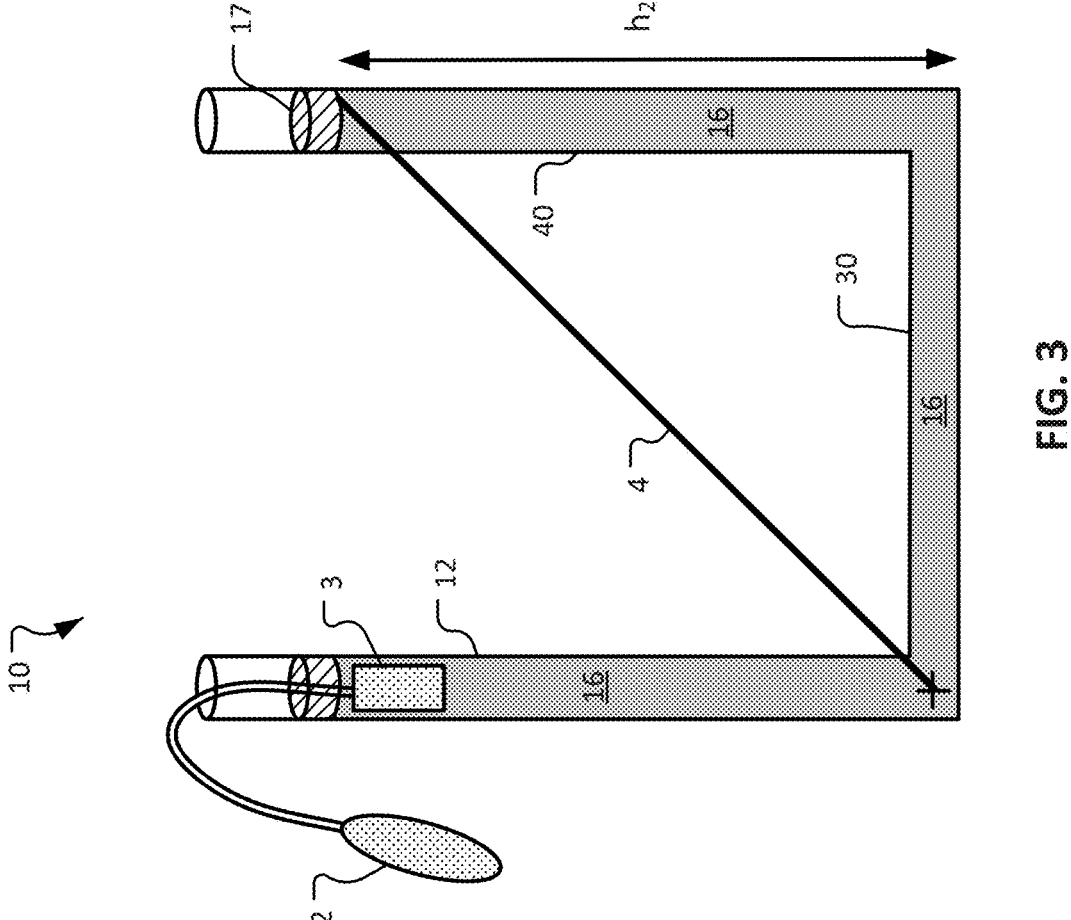
FIG. 3 is an illustration which shows the arrangement of FIG. 2 in another configuration.

Referring also to the schematic diagrams of FIGS. 2 and 3, the system 10 can also include a lever 4. The lever 4 is rotatably coupled to the base of the fixed container 12 at a first axis. Accordingly, the lever 4 can rotate about the first axis.

FIG. 2 shows the system 10 with the outer container 40 having an initial fluid column height $h_1$. FIG. 3 shows the system 10 with the outer container 40 having an initial fluid column height $h_2$. The height $h_2$ is greater than the height $h_1$. It follows then, that if we consider only the weight of the fluid mass of Vadditional 17 applied to the lever 4 of FIG. 3 results in a greater torque of the lever 4 about its axis of rotation as compared to the weight of the fluid mass of Vadditional 17 applied to the lever 4 of FIG. 2. This remains true even though the added work required to squeeze the ball 2 to increase the fluid column heights in the containers 12/40 (resulting in Vadditional 17) is the same in both FIG. 2 and FIG. 3.

Figure 4:
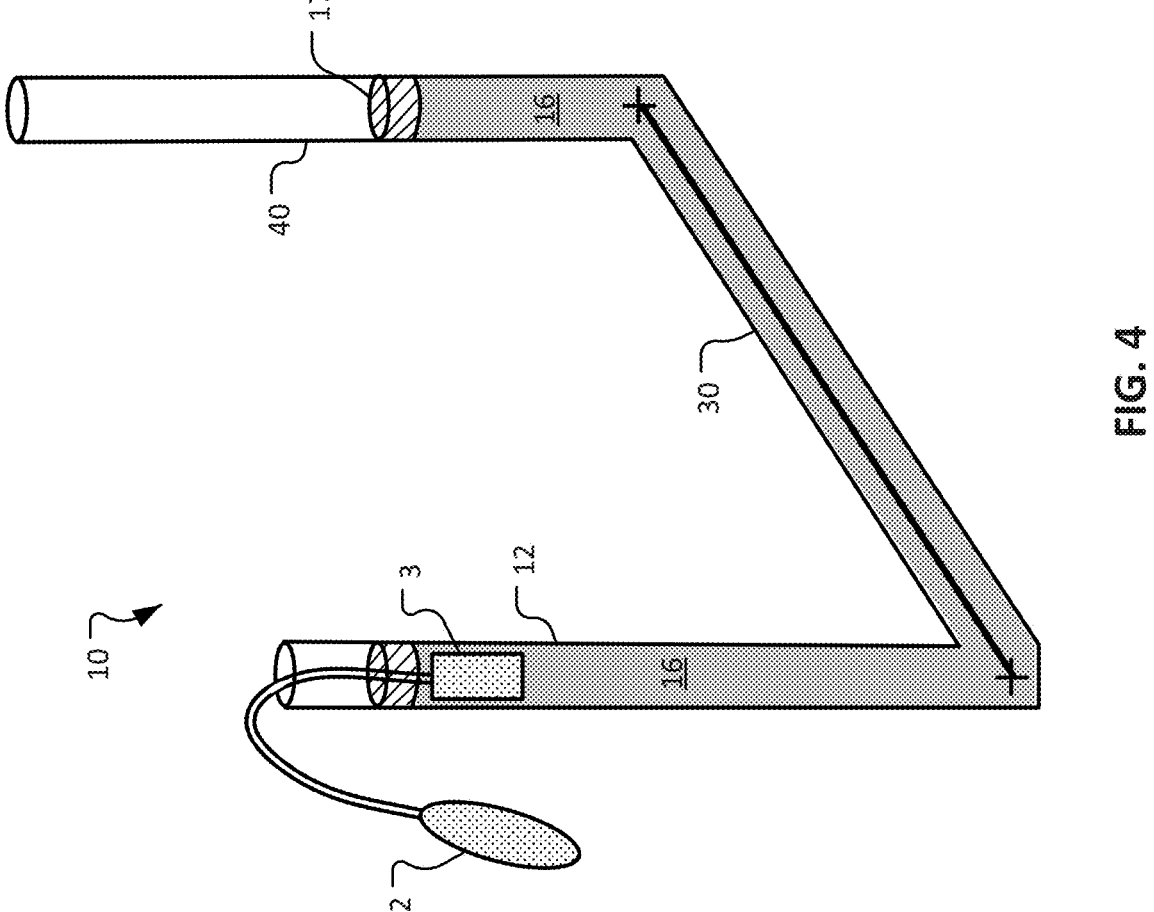
FIG. 4 is an illustration which shows the arrangement of FIG. 3 with the lever being the conduit that fluidly interconnects the communicating vessels.

Referring also to FIG. 4, here the interconnecting conduit 30 has been combined with the lever 4 to create an interconnecting lever conduit 30. The interconnecting lever conduit 30 functions not only to fluidly interconnect the containers 12 and 40, but also to act as a lever. A first end of the interconnecting lever conduit 30 is rotatably coupled to the fixed container 12 and the other end the interconnecting lever conduit 30 is rotatably coupled to the outer container 40. The rotatable couplings can comprise rotary unions that allow fluid to flow through the rotatable connections. This arrangement allows the interconnecting lever conduit 30 itself to be used as the lever with the axis of rotation at the bottom of the fixed container 12, and the outer container 40 residing at the outer end of the interconnecting lever conduit 30.

As work is added to increase the fluid column height in the fixed container 12 (e.g., from expanding the bladder 3) the natural equalization of the fluid column pressures in the communicating vessels of the system 10 causes fluid 16 to be displaced, and Vadditional 17 is displaced to the top of the fluid column in outer container 40. With the interconnecting lever conduit 30 being rotationally balanced and free to rotate about its axis of rotation at the bottom of the fixed container 12, the added weight of the fluid column height in the outer container 40 due to Vadditional 17 causes a torque of the interconnecting lever conduit 30 about its axis of rotation at the bottom of the fixed container 12.

Figure 5:
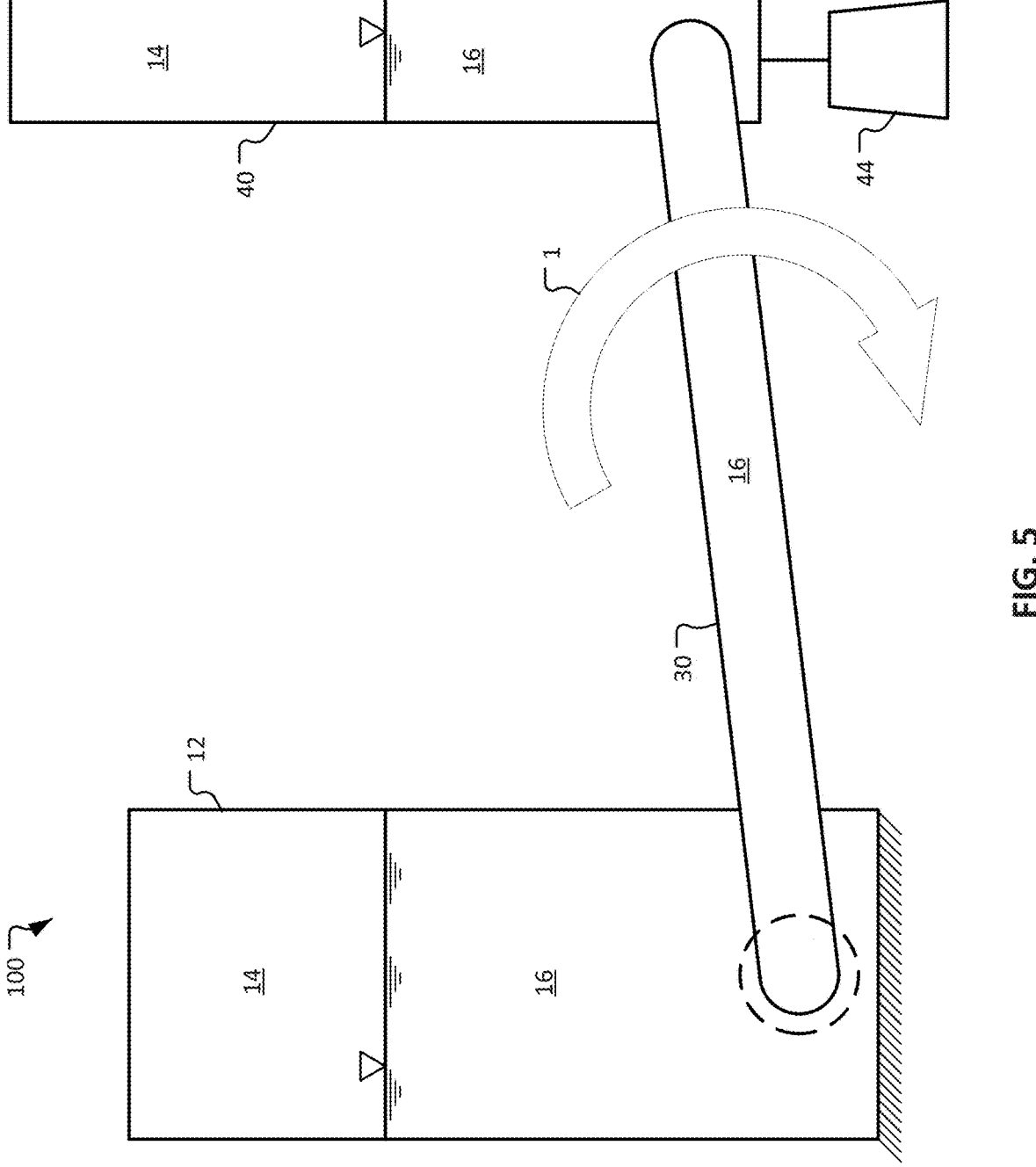
FIG. 5 is a schematic illustration showing a front view of another example communicating vessel system with the conduit that fluidly interconnects the communicating vessels acting as a lever.

FIG. 5 depicts a communicating fluid vessel system 100 that is analogous to the system 10 described above. There are three main parts of the system 100: the fixed container 12 (containing the fluid 16); the interconnecting lever conduit 30 (containing the fluid 16); and the outer container 40 (containing the fluid 16). The interconnecting lever conduit 30 fluidly couples the fixed container 12 with the outer container 40. The system 100 uses the combined principles of a mechanical lever and a communicating fluid vessel system.

The system 100 includes the two containers (the fixed container 12 and the outer container 40) that are each filled with a homogeneous fluid (the fluid 16). The fixed container 12 and the outer container 40 are in fluid communication with each other via the interconnecting lever conduit 30, are subject to the same atmospheric pressure, and are connected at their bases by the interconnecting lever conduit 30 (which acts as a mechanical lever).

When the fluid 16 is settled in the system 100, the fluid 16 balances out to the same level (elevation) in both of the containers 12 and 40 regardless of the shape and volume of the containers 12 and 40. Naturally, a change in fluid column height in one container will cause an equal change in the fluid column height in all containers of the system 100. However, even though the fluid column heights in all containers of the system 100 change equally, the associated change in volume of fluid in each container will be allocated based upon the fluid surface area of each container. For example, if a first container has twice the cross-sectional surface area of fluid as compared to a second container, the first container will receive double the fluid volume of the second container when fluid is added to the containers.

Still referring to FIG. 5, the fixed container 12 is fixed in space. In some embodiments, the container 12 resides on a stand, a foundation, and the like (not shown). The outer container 40, in contrast, rotates or revolves 360° around the fixed container as indicated by the arrow 1. The circular path followed by the outer container 40 around the fixed container 12 is defined or controlled by the interconnecting lever conduit 30 that fluidly and mechanically interconnects the fixed container 12 and the outer container 40.

The interconnecting lever conduit 30 is multifunctional. That is, first, the interconnecting lever conduit 30 acts as a pivotable mechanical connection between the fixed container 12 and the outer container 40. In that sense, it can be said that the interconnecting lever conduit 30 acts as a lever arm. In addition, the interconnecting lever conduit 30 allows fluid flow therethrough such that the interiors of the fixed container 12 and the outer container 40 are fluidly connected. In that sense, it can be said that the interconnecting lever conduit 30 acts as a hose or fluid conduit.

Since the interior volumes of the fixed container 12 and the outer container 40 are fluidly connected by the interconnecting lever conduit 30, the interfaces between the fluid 16 and the air 14 in both of the containers 12 and 40 are at, and by nature will always be at, the same elevation. Said simply, the level of the fluid 16 in each of the containers 12 and 40 will always be at equal elevations (even as the outer container 40 rotates around the fixed container 12). This is the principle of a communicating fluid vessel system.

Attached to the outer container 40 (or integral therewith) is a weight 44. The weight 44 serves to keep the outer container 40 essentially vertical (as depicted in FIG. 5) as the outer container 40 rotates around the fixed container 12.

A rotary union can be used at the rotatable junction between the outer container 40 and the interconnecting lever conduit 30. Accordingly, as the outer container 40 rotates around the fixed container 12, the fluid 16 can freely pass between the outer container 40 and the fixed container 12 via the interconnecting lever conduit 30, and the outer container 40 can remain essentially vertical.

The orientation of the interconnecting lever conduit 30 relative to the fixed container 12 can be defined in reference to the position of an arm on an analog clock. For example, when the interconnecting lever conduit 30 is extending straight upward relative to the fixed container 12, it can be said that the interconnecting lever conduit 30 (and the outer container 40) is at the 12 o'clock position. Or, when the interconnecting lever conduit 30 is extending laterally (horizontal) relative to the fixed container 12, it can be said that the interconnecting lever conduit 30 (and the outer container 40) is at the 3 o'clock position or the 9 o'clock position (depending on whether the interconnecting lever conduit 30 is extending rightward or leftward from the fixed container 12). This nomenclature (using the clock analogy) will be used hereafter to describe the relative position of the outer container 40 (and the middle container 60) relative to the fixed container 12.

System 100, as described further below, is composed of three fluidly communicating containers: (i) the fixed container 12, (ii) the outer container 40, and (iii) a middle container 60 (not shown here for simplicity, see FIGS. 7-12, for example). All three containers 12, 40, and 60 are open to the environment 14 at the top. All three containers 12, 40, and 60 are closed on their respective bottom and sides. The three communicating containers 12, 40, and 60 are configured to hold a fluid 16, say water. Hereafter in this disclosure, air 14 and water 16 will be used for simplicity sake. It should be understood, however, that other fluids can be used in the system 100 as long as the density of the fluids are differing.

As described further below, the core design of the communicating fluid vessel engine systems described herein is that multiple communicating fluid vessel systems (e.g., the system 100) are arranged in the design of a wheel and axle such that the fixed container 12 of each system 100 fixedly resides on the axis of the wheel, the interconnecting lever conduit 30 acts as a spoke in the wheel, and outer container 40 resides on the rim of the wheel. As described further below, multiple outer containers 40 can be equally spaced around the wheel. Each system 100 can be identical, and all can contain the same volume of fluid 16. The wheel and axle design is intended to be rotationally balanced before any displacement of fluid 16 in the fixed container 12 of any system 100.

Figure 6:
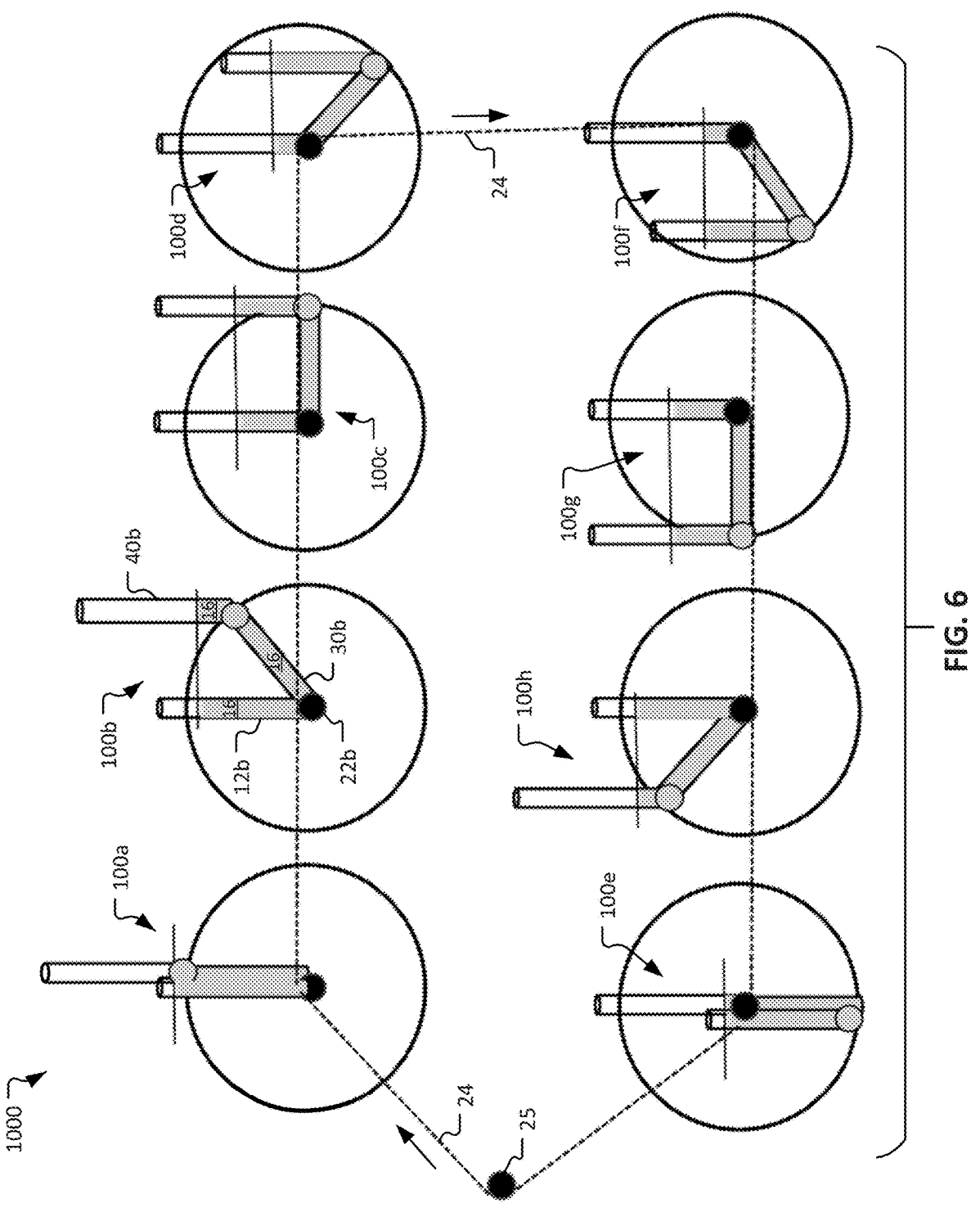
FIG. 6 is a schematic illustration showing eight of the one-lever communicating vessel systems of FIG. 5 that are mechanically coupled to operate together.

Referring also to FIG. 6, multiple systems 100 can be mechanically coupled together (or ganged together) to create an overall system 1000. In the depicted example, eight systems 100a, 100b, 100c, 100d, 100e, 100f, 100g, and 100h (collectively referred to as systems 100a-h) are mechanically coupled together to create the overall system 1000. It should be understood that, while the depicted example includes the eight systems 100*a-h*, any practical number of the systems 100 can be mechanically coupled together to create an overall system 1000. For example, two systems 100, three systems 100, four systems 100, and so on, can be mechanically coupled together to create an overall system 1000. In addition, it should be understood that FIG. 6 is a schematic illustration that, for the sake of clarity, does not show all portions of the systems 100*a-h*. For example, as described further below, the systems 100*a-h* each include a middle container and other components. Those portions are not shown in FIG. 6 so that the concept of mechanically coupling together multiple systems 100*a-h* in the manner shown can be understood without obscurity from excessive detail at this point.

The construction of each of the systems 100*a-h* is the same in this example. In FIG. 6, the exemplary system 100*b* includes labels for its fixed container 12*b*, outer container 40*b*, and interconnecting lever conduit 30*b*. The system 100*b* also includes a sprocket 22*b* that rotates in correspondence with the rotation of the interconnecting lever conduit 30*b*. It should be understood that the other systems 100*a* and 100*c-h*, while not labeled, include the same components as the system 100*b*.

In this example, sprockets (e.g., the sprocket 22*b* of the system 100*b*) are included on each of the systems 100*a-h*. Those sprockets are each movably coupled to a continuous chain 24. The chain 24 is also coupled to a driven sprocket 25 that is attached to a shaft. The chain 24 drives the rotation of the driven sprocket 25 and its associated shaft. That shaft can be coupled to a generator, for example, for generating electricity. In the depicted example, the chain 24 is moving clockwise. While the depicted overall system 1000 uses the sprockets and chain 24, it should be understood that various other types of power transmission systems can be used (e.g., gears, power transmission shafts, hydraulics, and the like).

In the depicted orientation of the overall system 1000 (which, collectively, is essentially akin to a wheel and axle), it can be observed that the system 100*a* is orientated in the 12 o'clock position. In addition, it can be observed that the system 100*c* is orientated in the 3 o'clock position. The system 100*b* is orientated midway between the systems 100*a* and 100*c*. Accordingly, it can be stated that the system 100*b* is orientated at the 1:30 o'clock position. The other systems 100*d-h* are oriented in other positions. For example, system 100*d* is oriented in the 4:30 o'clock position, the system 100*e* is oriented in the 6 o'clock position, the system 100*f* is oriented in the 7:30 o'clock position, the system 100*g* is oriented in the 9 o'clock position, and the system 100*h* is oriented in the 10:30 o'clock position. These orientations change (e.g., progress) as the overall system 1000 rotates via the chain 24, but the relative orientations between respective systems 100*a-h* stay constant while the overall system 1000 rotates.

To put it another way, the systems 100*a-h* are incrementally oriented at 45° apart from each other. That is, for example, the system 100*b* is 45° clockwise in relation to system 100*a*. Similarly, the system 100*c* is 45° clockwise in relation to the system 100*b*, the system 100*d* is 45° clockwise in relation to the system 100*c*, the system 100*e* is 45° clockwise in relation to the system 100*d*, the system 100*f* is 45° clockwise in relation to the system 100*e*, the system 100*g* is 45° clockwise in relation to the system 100*f*, the system 100*h* is 45° clockwise in relation to the system 100*g*, and the system 100*a* is 45° clockwise in relation to the system 100*h*. These incremental differences of 45° are maintained as the overall system 1000 rotates/operates.

It can be observed in FIG. 6 that the water in the fixed container 12 and water the outer container 40 are at equal elevations in each of the systems 100*a-h* (no matter what orientation the systems 100*a-h* are in). For example, referring to the exemplary system 100*b*, the water 16 in the fixed container 12*b* is at the same elevation as the water 16 in the outer container 40*b*. The equal elevations of the water are indicated by the horizontal lines drawn in each of the systems 100*a-h*. While the elevations of the water in the fixed container and the outer container remain equal, the volumes of the water in the fixed container 12 and the outer container 40 change, even though the total volume of water 16 in a system 100 remains the same.

Referring again to the exemplary system 100*b* in the orientation depicted in FIG. 6, it can be envisioned that the weight of the water 16 in the outer container 40*b* and the interconnecting lever conduit 30*b* will create a clockwise torque at the sprocket 22*b* that will tend to urge the chain 24 in a clockwise direction. That is, with the outer container 40*b* and the interconnecting lever conduit 30*b* being laterally offset from a vertical axis extending through the sprocket 22*b*, the pull of gravity on the mass of the outer container 40*b*, the interconnecting lever conduit 30*b*, and the water 16 therein will generate a clockwise torque at the sprocket 22*b*.

Referring now to the other systems 100*a* and 100*c-h* in the orientations shown in FIG. 6, it can be envisioned that the systems 100*c* and 100*d* will also create clockwise torques at their respective sockets. Further, in can be envisioned that the systems 100*a* and 100*e* will be neutral (i.e., not generate any torque in the depicted orientation). Still further, it can be envisioned that the systems 100*f*, 100*g*, and 100*h* will create a counter-clockwise torque at the sprocket 22*b* that will tend to urge the chain 24 in the counter-clockwise direction.

The overall system 1000 (as depicted in its partial form in FIG. 6, which is not the complete form of the overall system 1000) is balanced. That is, in terms of the torques created at the sprockets of the systems 100*a-h*, every clockwise torque of one system is offset by an equal counter-clockwise torque of another system, or taken together the total clockwise rotational forces from multiple systems 100*a-h*, should be equal to the total counter-clockwise rotational forces from multiple systems 100*a-h*, in the overall system 1000. For example, the clockwise torque generated by the system 100*b* is offset by the equal counterclockwise torque generated by the system 100*h*. Similarly, the systems 100*a* and 100*e* offset (or counterbalance) each other, the systems 100*c* and 100*g* offset each other, and the systems 100*d* and 100*f* offset each other.

Figure 7:
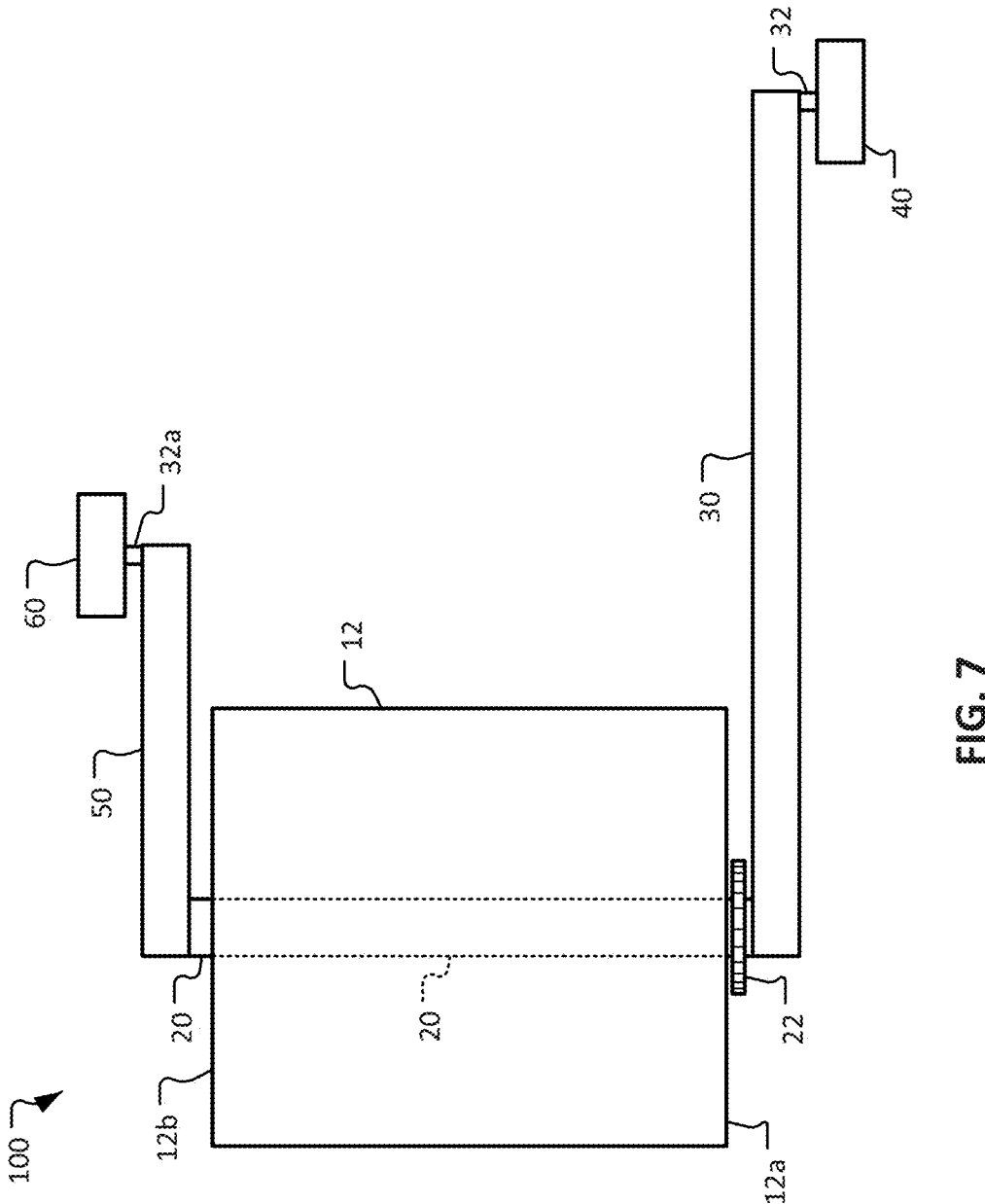
FIG. 7 is a schematic illustration showing a top view of an example two-lever communicating vessel system in accordance with some embodiments.

FIG. 7 is a top view of the system 100. The system 100 includes the fixed container 12, the interconnecting lever conduit 30, and the outer container 40 as described above. Now, the middle container 60 and its associated short lever conduit 50 are also shown for the first time.

The middle container 60 and the short lever conduit 50 function in the same manner as the outer container 40 and the interconnecting lever conduit 30 as described above. However, the short lever conduit 50 is shorter than the interconnecting lever conduit 30, so the middle container 60 is always closer to the fixed container 12 than the outer container 40.

Protruding from the front 12*a* and back 12*b* of the fixed container 12 is a tube 20 that resides in the container 12, and is designed to rotate 360 degrees in container 12 without allowing any water 16 to leak out of the fixed container 12. Near the front 12*a* of container 12, connected to tube 20, is the sprocket 22. Sprocket 22 connects by way of the chain 24 (FIG. 6) to the driven sprocket 25 that drives its associated shaft.

One end of tube 20, on the front 12*a* of fixed container 12, is connected to the interconnecting lever conduit 30, and the other end of the tube 20, on the back 12*b* of fixed container 12, is connected to the short lever conduit 50. The design of tube 20 allows water 16 to move into and out of fixed container 12, and into and out of the interconnecting lever conduit 30 and the short lever conduit 50 without any water 16 leaking out of system 100.

The outer container 40 rotates around the fixed container 12 with the central axis of the tube 20 as the pivot point. The outer container 40 remains upright while traveling a complete rotation around fixed container 12 by way of the rotary union 32 and the weight 44. The elevation of the water 16 changes in the outer container 40 as the outer container 40 rotates around the fixed container 12. However, the elevations of the water 16 in each of the three containers 12, 40 and 60, always remain equal to each other.

The tube 20 also connects to the short lever conduit 50, and a rotary union 32*a* connects the short lever conduit 50 to the middle container 60. The middle container 60 is (like the outer container 40) also designed to rotate around the fixed container 12, with the tube 20 acting as the pivot point. Like the outer container 40, the middle container 60 also remains upright while traveling complete rotations around the fixed container 12 by way of the rotary union 32*a* and a weight 44*a* (FIG. 8).

System 100 is designed so that the fluid in middle container 60 flows into and out of short lever conduit 50, and into and out of fixed container 12 based upon the position of the middle container 60 relative to the positions of fixed container 12 and the outer container 40. That is, as the middle container 60 rotates around the pivot point of the tube 20, the elevations of the water 16 in each of the three containers 12, 40 and 60, always remain equal to each other.

In the system 100, since it is a communicating vessel system, the elevations of the columns of water 16 in the fixed container 12, the middle container 60 and the outer container 40, always maintain an equal elevation with each other, even though the volume of fluid in each individual container varies as the middle container 60 and the outer container 40 rotate around their pivot points, or axes of rotation, found at the tube 20 of the fixed container 12.

Figure 8:
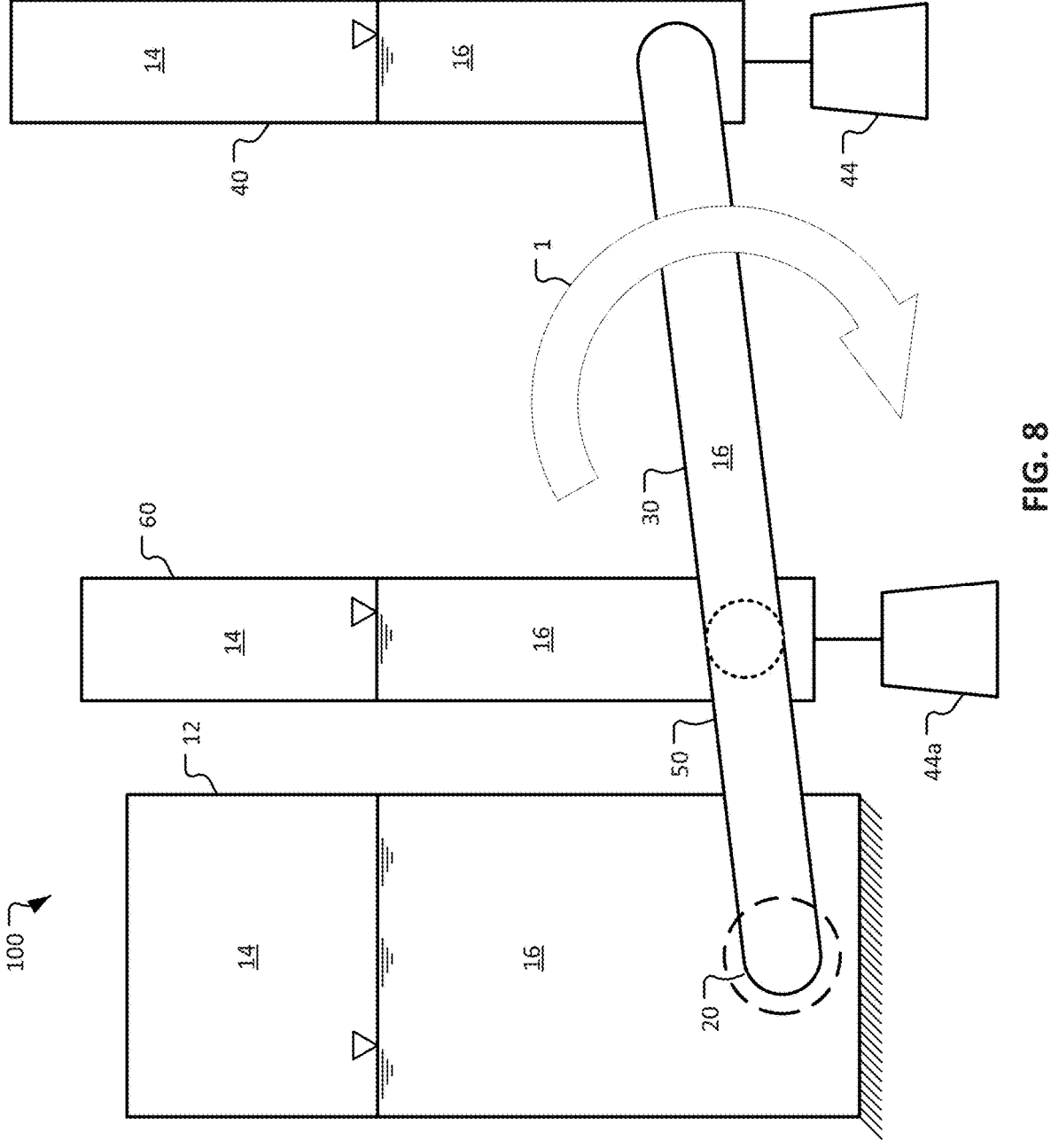
FIG. 8 is a schematic illustration showing a front view of the two-lever communicating vessel system of FIG. 7.

Referring also to FIG. 8, the short lever conduit 50 is connected to the interconnecting lever conduit 30 by way of the tube 20. The angle of rotation and orientation of both the interconnecting lever conduit 30 and the short lever conduit 50 is the same. Accordingly, as the short lever conduit 50 and its middle container 60, and the interconnecting lever conduit 30 and its outer container 40, rotate around the fixed container 12 they are always at the same angular orientation in relation to the fixed container 12. Accordingly, in this illustration the short lever conduit 50 is located out of view behind the interconnecting lever conduit 30.

In the system 100, as the outer container 40 and the middle container 60 rotate from their 12 o'clock positions to their 6 o'clock positions, the heights of the columns of water 16 rise in each container 40 and 60, and the height of the column of water 16 in fixed container 12 falls. Likewise, as the outer container 40 and the middle container 60 rotate from their 6 o'clock positions to their 12 o'clock positions, the heights of the columns of water 16 falls in each container 40 and 60, and the height of the column of water 16 in fixed container 12 rises. Such is the case because the elevations of the water 16 in each container 12, 40 and 60 are always equal with each other.

Typically, the volumes of the water 16 (and thereby the weights of the columns of water 16) found in the middle container 60 and outer container 40 at each point on one side of their rotation are equal to the volumes of the water 16 (and thereby the weights of the columns of water 16) at each mirror opposite point in the rotation of the middle container 60 and the outer container 40. Or said another way, in a complete rotation of the middle container 60 and the outer container 40 the clockwise rotational forces on the tube 20, equal the counterclockwise rotational forces on tube 20 (as was also described above in reference to FIG. 6).

It is understood that using a smaller number of system 100*s* to create a system 1000 will cause the rotational stability of the system 1000 to be disrupted at certain positions in the rotation, but this rotational instability can be reduced by increasing the number of system 100*s* used to make up a system 1000. This rotational instability does not change, with respect to the concepts described above, the basic manner in which the system 1000 functions.

Figure 9:
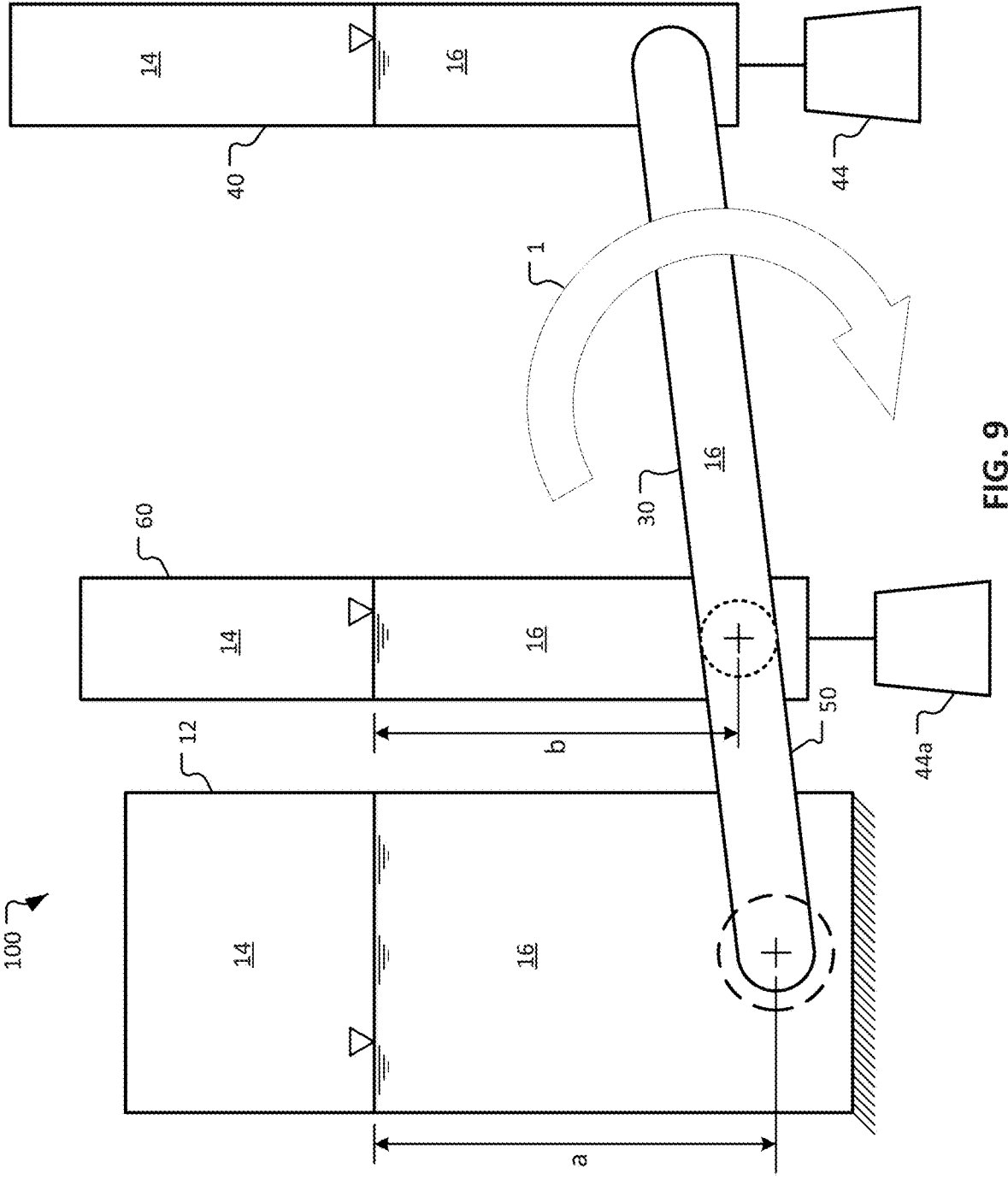
FIG. 9 is another schematic front view of the two-lever communicating vessel system of FIG. 7.

Turning our attention to FIG. 9, as the outer container 40 and middle container 60 rotate around the fixed container 12, the volume of the water 16 in each of the three containers 12, 40, and 60 changes. Generally, as the middle container 60 and the outer container 40 rotate 180° between the 12 o'clock and 6 o'clock positions, water 16 drains from the fixed container 12 and flows into the middle container 60 and the outer container 40. This process is reversed as the middle container 60 and the outer container 40 rotate 180° from the 6 o'clock to the 12 o'clock positions.

If the fixed container 12, the middle container 60, and the outer container 40 are spaced apart on the short lever conduit 50 and the interconnecting lever conduit 30 correctly, and if the fixed container 12, the middle container 60 and the outer container 40 are sized properly, then, in a complete 360° rotation of the middle container 60 around the fixed container 12, the height of the column of the water 16 in the fixed container 12 will decrease at the same rate that the height of the column of water 16 in the middle container 60 will increase on one side of the rotation (from 12 o'clock to 6 o'clock), and the height of the column of water 16 in the fixed container 12 will increase at the same rate as the column of water 16 in the middle container 60 will decrease on the other side of the rotation (from 6 o'clock to 12 o'clock). Or said another way, if the fixed container 12, middle container 60 and outer container 40 are sized and positioned properly, the fixed container's 12 column of water 16 will fall at the same rate that the middle container's 60 column of water 16 rises on one side of the rotation, and the fixed container's 12 column of water 16 will rise at the same rate that the middle container's 60 column of water 16 falls on the other side of the rotation.

In FIG. 9, the distance "a" is the total distance between the upper surface of the water 16 in the fixed container 12 and the central axis about which the interconnecting lever conduit 30 and short interconnecting lever conduit 50 rotate (i.e., the central axis of the tube 20). The distance "b" is the total distance between the upper surface of the water 16 in the middle container 60 and the central axis of the rotary union 32*a* (FIG. 7) that connects the short lever conduit 50 to the middle container 60. At all rotational positions of the interconnecting lever conduits 30 and 50 (and the containers 40 and 60) relative to the fixed container 12, the sum total of the distances "a" and "b" is always a constant distance.

The reason for this is that as the middle container 60 and outer container 40 fall in their rotation from the 12 o'clock position to the 6 o'clock position, both containers take in a volume of water 16 from the fixed container 12, and as the middle container 60 and the outer container 40 rise in their rotation from the 6 o'clock position to the 12 o'clock position, both containers 40 and 60 give back a volume of their water 16 to the fixed container 12.

The volumes of water 16 that move between each of the three containers, 12, 40 and 60 are dependent on two relationships. The first relationship is the relative position (elevation) of each container relative to the other two containers, at each position in the rotation. The second relationship is the cross-sectional areas of the fluid surface in each container in relation to the other two containers. The distance from the pivot point found on fixed container 12 that the middle container 60 and the outer container 40 are located at, determine how far, and at what speed, each container falls and rises in a complete rotation.

Figure 10:
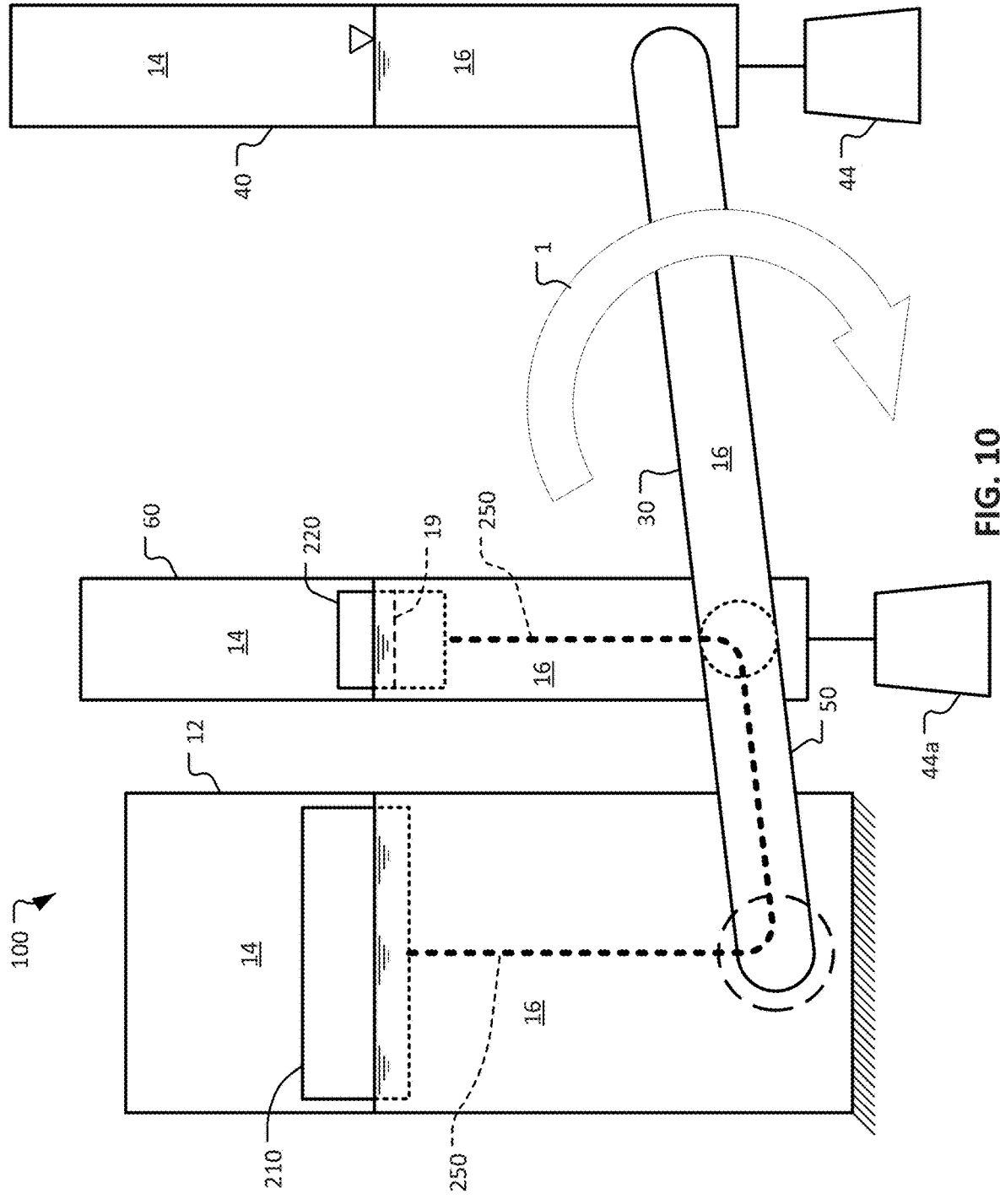
FIG. 10 is another schematic front view illustration of the two-lever communicating vessel system of FIG. 7, showing additional components of the system.

As shown in FIG. 10, the system 100 also includes a float 210, a holding tank 220, and a tether 250. The float 210 is a buoyant member in the fixed container 12. The holding tank 220 is an open-bottom buoyant member in the middle container 60. The presence of the float 210 and the holding tank 220 does not change, with respect to the concepts described above, the basic manner in which the system 100 functions.

The tether 250 attaches the float 210 and the holding tank 220 to each other. Accordingly, the movements of the float 210 and the holding tank 220 are linked together by the tether 250, which has a constant length. The tether 250 is routed between the fixed container 12 and the middle container 60 in a manner that allows for the rotation of the tube 20 without affecting (e.g., entangling) the tether 250. For example, in some embodiments the tether 250 is routed through an outer sleeve surrounding the tube 20.

The float 210 and the tether 250 are designed to keep holding tank 220 from rising in relation to the upper surface of the water 16 (the waterline) found in middle container 60. If holding tank 220 does rise from changes in its buoyancy, the lost displacement of the fluid 16 is replaced by the greater displacement of fluid 16 from the float 210. The purpose of strategically sizing each container 12, 40 and 60 and placing middle container 60 and outer container 40, a certain distance from the pivot point found on fixed container 12, all as described above, is so that tether 250 does not lose its effectiveness because of the changing water levels in fixed container 12 and middle container 60.

Since the float 210 and the holding tank 220 are residing at the interface between the water 16 and the air 14 in each of the fixed container 12 and the middle container 60, respectively, it can be envisioned that as water 16 flows into or out of the holding tank 220, as described below, the corresponding change in volume of the water 16 (and mass of the water 16) will be substantially greater in outer container 40 than if the float 210 and the holding tank 220 were not present in the fixed container 12 and the middle container 60.

The holding tank 220 is a container with an at least partially open bottom portion (so that water 16 can pass into and out of the interior of the holding tank 220). At least an upper portion of the interior of the holding tank 220 contains air 14, which keeps it buoyant. Inside of the holding tank 220 is a fluid-to-air interface line 19 between the denser water 16 and the less dense air 14. Changes in the volume of air 14 found in the holding tank 220 inversely change the amount of water 16 in the holding tank 220. That is, as air 14 is added into the interior of the holding tank 220, the fluid-to-air interface line 19 lowers within the holding tank 220 and some water 16 from the interior of the holding tank 220 exits the holding tank 220 and enters the middle container 60 (on the outside of the holding tank 220).

Since all three containers 12, 40, and 60 are in fluid communication with each other, as the water 16 exits the holding tank 220 and enters the middle container 60 (outside of the holding tank 220), the elevation of the water 16 in each of the containers 12, 40, and 60 rises (to stay at equal elevations). Because the surface areas of the water 16 in the fixed container 12 and the middle container 40 are much smaller (due to the crowding-out effect of float 210 and the holding tank 220) than the surface area of the water 16 in the outer container 40, an equal rise in elevation corresponds to a receipt in the outer container 40 of a much greater volume of the water 16. That is, when air is added to the holding tank 220, the outer container 40 receives a much greater volume and weight of water 16 than the fixed container 12 or the middle container 60, than outer container 40 would have received without the presence of float 210 and holding tank 220.

Again, as air is added to the holding tank 220 the resulting rise in the elevations of the water 16 in each of the containers 12, 40, and 60 will be equal. That holds true no matter how long the interconnecting lever conduit 30 is. That is the nature of a communicating fluid vessel system. For example, the rise in the elevations of the water 16 in each of the containers 12, 40, and 60 will be equal when the interconnecting lever conduit 30 is short, and the rise in the elevations of the water 16 in each of the containers 12, 40, and 60 will be equal when the interconnecting lever conduit 30 is long. Said differently, the fact that the elevations of the water 16 in each of the containers 12, 40, and 60 are equal is independent of the length of the interconnecting lever conduit 30.

As described above in reference to FIGS. 6 and 7, when the system 100 is oriented between the 12 o'clock position and the 6 o'clock position, clockwise torque will be generated at the sprocket 22. Of course, since torque equals force times distance, more torque will be generated when the interconnecting lever conduit 30 is longer than when the interconnecting lever conduit 30 is shorter. This essentially is the mechanical advantage of a lever (i.e., the interconnecting lever conduit 30). Accordingly, while the rise in the elevations of the water 16 in each of the containers 12, 40, and 60 is independent of the length of the interconnecting lever conduit 30, making the interconnecting lever conduit 30 longer generates more clockwise torque at the sprocket 22 (when the system 100 is oriented between the 12 o'clock position and the 6 o'clock position) than a shorter interconnecting lever conduit 30.

The float 210 (in the fixed container 12) and the holding tank 220 (in the middle container 60) are tethered to each other so that together they displace a constant volume of their surrounding water 16 as they float in the fixed container 12 and the middle container 60. The float 210 and the holding tank 220 are tethered to each other so that the total displacement of both the float 210 and holding tank 220 remains the same, even as the elevations of the columns of water 16 change in the three containers 12, 60, and 40 (e.g., as the middle container 60 and outer container 40 rotate around the fixed container 12, refer to FIG. 6). In addition, the float 210 and the holding tank 220 are designed to minimize the surface area of the water 16 in the fixed container 12 and middle container 60 so that any changes to the elevations of the columns of the water 16 (not caused by the rotation of outer container 40 and middle container 60) will be allocated on a volume and weight basis to a greater extent to the outer container 40 than to the fixed container 12 or the middle container 60. Said another way, changes to the displacement of water 16 by holding tank 220 because of changes in the volume of air 14 in holding tank 220 are volumetrically allocated in favor of outer container 40.

It is advantageous when changes in the holding tank's 220 displacement of its surrounding water 16 cause the greatest changes in the volume and weight of water 16 in the outer container 40. That is the case because the outer container 40 is the container located farthest from the pivot point (at the axis of the tube 20), will maximize the mechanical advantage of the interconnecting lever conduit 30. In other words, the torque at the sprocket 22 (FIGS. 6 and 7) that is generated by the outer container 40 between the 12 o'clock and 6 o'clock positions is increased to a greater extent when the majority of the weight of the water 16 is added to the outer container 40 (rather than to the fixed container 12 or the middle container 60).

Figure 11:
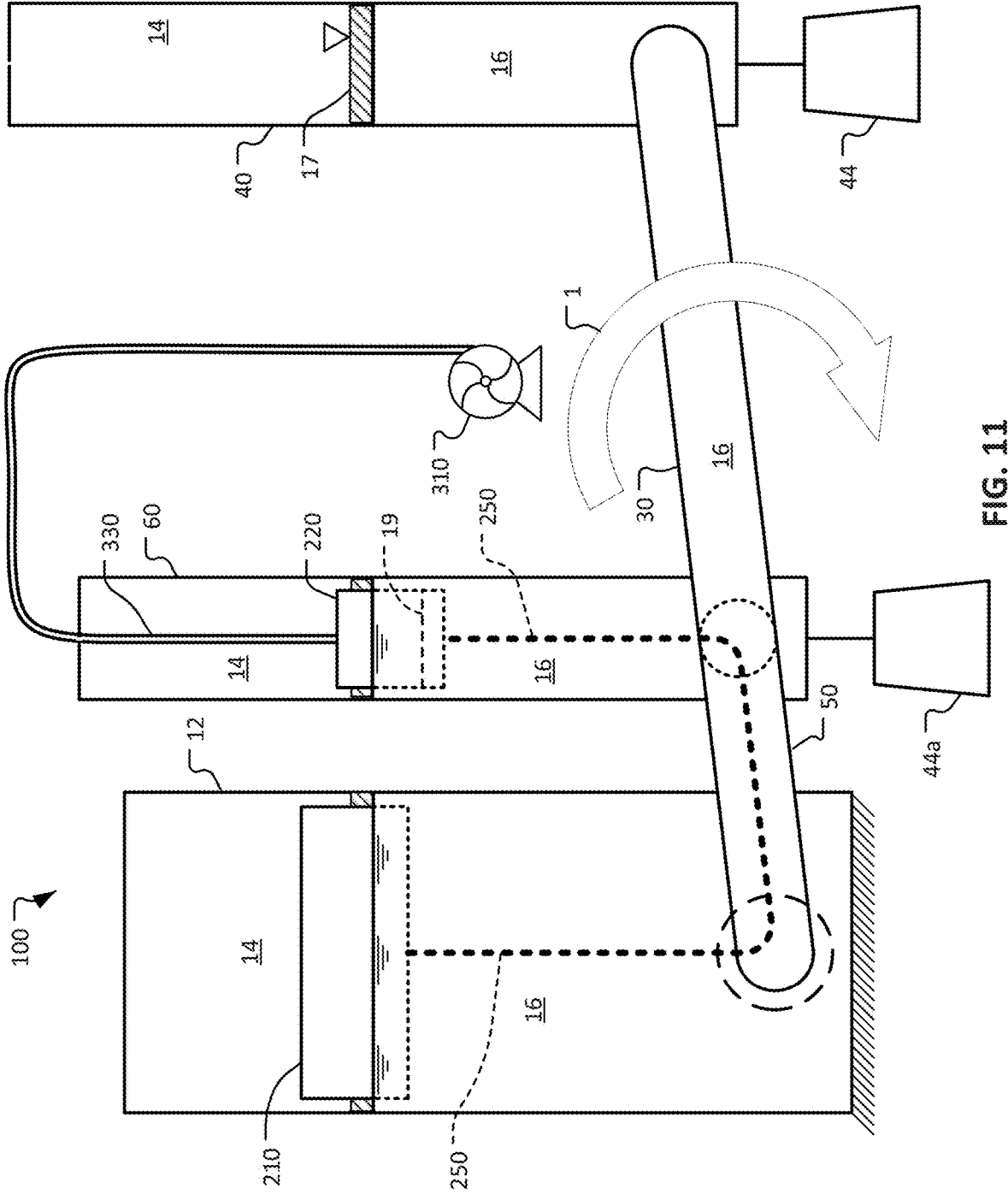
FIG. 11 is another schematic front view illustration of the two-lever communicating vessel system of FIG. 7, showing additional components of the system.

As shown in FIG. 11, the system 100 also includes a compressor 310. The compressor 310 can discharge a pressurized gas, such as air 14, to infill the holding tank 220. The compressor 310 can be electrically driven by a motor in some embodiments. In some examples, the compressor 310 can be mechanically assisted by the rotations of the interconnecting lever conduit 30 and/or the short lever conduit 50.

As air 14 is moved into holding tank 220, gravity causes the elevation of the water 16 in middle container 60 to seek equilibrium, moving a volume of the water 16 to the fixed container 12 and a volume of the water 16 to outer container 40. Said another way, the water column heights of the vessels within the system 100 will always seek elevation equilibrium. The allocation of the change in volume and weight of the water 16 displaced by the change of the volume of the air 14 in the holding tank 220 is divided between the fixed container 12, the outer container 40, and middle container 60 based upon the surface areas of the water 16 in each of the three containers 12, 40, and 60. Since the float 210 and holding tank 220 are designed to crowd out most of the surface area of the water 16 in the fixed container 12 and the middle container 60, most of the change in the volume and weight of the water 16 occurs in the outer container 40. This principle holds true as the amount of air 14 in the holding tank 220 increases (a greater amount of increase of volume/weight of the water 16 occurs in the outer container 40 as compared to if the float 210 and holding tank 220 were not present), and also as the amount air 14 in the holding tank 220 decreases (a greater amount of decrease of volume/weight of the water 16 occurs in the outer container 40 as compared to if the float 210 and holding tank 220 were not present).

Air 14 is moved to and from holding tank 220 by way of the compressor 310. The air 14 is moved into holding tank 220 when its outer container 40 is at the top of the rotation (at the 12 o'clock position), and the air 14 is moved out of the holding tank 220 when its outer container 40 is at the bottom of the rotation (at the 6 o'clock position). Operating the compressor 310 in this manner is akin to expanding the bladder 3 of the system 10 in FIGS. 1-4 to displace the additional fluid 17 to the top of the fluid column in the outer container 40.

It should be understood that the additional fluid 17 found in the outer containers 40 on one side of the rotation (from 12 o'clock to 6 o'clock), but not the other side of the rotation (from 6 o'clock to 12 o'clock), is used to rotate the system

1000. After the additional fluid 17 in each outer container 40 reaches the bottom of the rotation (at 6 o'clock), the additional fluid 17 is then shifted out of its outer container 40 and melds into the fluid 16 of the overall system 100. Since the fluid 16 is fungible, the force of the additional fluid 17, as it melds into the fluid 16 of its overall system 100, essentially moves from outer container 40 back to middle container 60 and fixed container 12, and remains in middle container 60 and fixed container 12, until it is again needed when its outer container 40 is at the top of the rotation (at 12 o'clock).

Essentially, the additional fluid 17 in each outer container 40 falls from the top of the rotation (at 12 o'clock) to the bottom of the rotation (at 6 o'clock), causing the system 1000 to rotate. At the bottom of the rotation (at 6 o'clock), the additional fluid 17 is moved away from its outer container 40 and becomes part of the fluid 16 in its overall system 100. This transfers the volume/weight of additional fluid 17 to the middle container 60 and fixed container 12, to wait until the outer container 40 once again reaches the top of the rotation (at 12 o'clock).

In its simplest form the system 100 is the combination of: (i) a lever and (ii) a communicating fluid vessel system. To work in cooperation with substantial effectiveness, a number of these lever/communicating fluid vessel systems 100 can be coupled or ganged together in a balanced fashion to create the overall system 1000 (e.g., as shown in FIG. 6) with the interconnecting lever conduits 30 being equally spaced apart like spokes in a Ferris wheel. The pivot points of the interconnecting lever conduits 30 of the overall system 1000 represent the center of this Ferris wheel-like design, and the gondolas at the end of each spoke correspond to the outer containers 40. If each system 100 had a common pivot point, the outer containers 40 would become entangled with each other. Therefore, the overall system 1000 can be designed so that each system 100 is coupled to a common shaft, and the common shaft can also drive an electricity generator, pump, or other useful device.

The overall system 1000 (e.g., as shown in FIG. 6) is designed so that the added weight from the additional fluid 17 in the outer container 40 at the end of each interconnecting lever conduit 30 (resulting from changes in the column heights in its communicating vessels) intentionally occurs on one side of the rotation of the outer containers 40, and does not occur on the opposite side of the rotation. By ganging these systems 100 together, and by adding work to the systems 100 from the compressors 310, rotational energy is applied to the common shaft to make the system 1000 rotate.

Some of the rotational energy created by the rotating system 1000 is consumed by the energy required to lift the fluid 16 in each outer container 40 from the bottom of the rotation back to the top of the rotation. However, decreasing the volume of air 14 in holding tank 220 when its outer container 40 is at the bottom of the rotation decreases the amount of fluid 16 in outer container 40. Additionally, before air 14 is moved into the holding tanks 220 of any of the multiple systems 100 that are ganged together, the wheel and axle design is rotationally balanced. Being rotationally balanced reduces the work needed to rotate the wheel to return each outer container 40 from the bottom to the top of the rotation.

As described above, moving air 14 into the holding tank 220 increases the elevation of the fluid 16 in the middle container 60. Then, after the fluid elevations in all three containers 12/40/60 have naturally equalized, the fluid Vadditional 17 results at the end of the interconnecting lever conduit 30. Conversely, moving air 14 out of the holding tank 220 reduces the elevation of the fluid 16 in the middle container 60. Then, after the fluid elevations in all three containers 12/40/60 have naturally equalized, Vadditional 17 is no longer present at the end of its lever conduit 30.

Increasing the length of the interconnecting lever conduit 30 in each system 100 increases the distance that each Vadditional 17 can fall during rotation, which increases the work that each Vadditional 17 can individually do.

The holding tank 220, being linked to the float 210 by the tether 250, maintains its partially submerged orientation with respect to the interface between the fluid 16 and the air 14, as the elevation of the fluid 16 in middle container 60 rises and falls. This position maintains the effectiveness of the displacement of fluid 16 in holding tank 220 (to be in favor of the outer container 40 by weight/volume of water 16), as well as reduces the amount of work needed from the compressor 310 to move air 14 into and out of holding tank 220.

FIGS. 1-11 describe the system 100 embodied as a continuous rotational system where the outer container 40 rotates or revolves 360° around the fixed container 12, but it is possible to harness the benefits of the system as a limited rotational system where an outer container does not fully rotate or revolve around a fixed container. To this end, FIGS. 12-24 describe a system having at least one communicating vessel with at least one lever, which are constructed as a rotationally balanced structure. The system uses changes in fluid pressure to shift fluid mass to a fluid column of a communicating vessel located at the end of the lever when the lever is at the top of its rotation, such as at the 1 o'clock position, and uses changes in fluid pressure to shift fluid mass away from a fluid column of a communicating vessel at the end of the lever when the lever reaches the bottom of its rotation, such as at the 5 o'clock position.

FIGS. 12-16 are schematic front view illustrations of various positions of an engine system with two communicating fluid vessels 300, in accordance with embodiments of the present disclosure. The engine system with two communicating fluid vessels 300, which may be referred to as 'system 300' includes at least two fluid containers, but may include three or more fluid containers, as discussed relative to FIGS. 17-20. The at least two fluid containers depicted in FIGS. 12-16 may be understood as a first fluid container 312 which positioned at or near a rotational axis of at least one interconnecting lever conduit 330, generally at or near an interior of the interconnecting lever conduit 330, and an outer fluid container 340 which is positioned at or proximate to a terminating end of the interconnecting lever conduit 330. Both the first fluid container 312 and the outer fluid container 340 contain a column of fluid.

The interconnecting lever conduit 330 also contains the fluid and is rotatably coupled to containers 312, 340. The interconnecting lever conduit 330 also defines a fluid passageway by which the containers 312, 340 (and additional possible containers) are in fluid communication. Accordingly, the interconnecting lever conduit 330 is both mechanically connected between containers 312 and 340, and is in fluid communication with containers 312 and 340, such that containers 312, 340 are physically connected to the interconnecting lever conduit 330 and fluid can move between containers 312 and 340 through the interconnecting lever conduit 330. The fluid pathway within the interconnecting lever conduit 330 may include an internal passageway which allows for the flow of fluid, or it may include a connecting hose or similar structure which allows fluid to move between containers 312, 340. The interconnecting lever conduit 330 is pivotal about an axis 334.

The system 300 is rotationally balanced about axis 334, such that the containers 312, 340 positioned on the interconnecting lever conduit 330 exert forces on the axis 334 that result in the net rotational force, or net torque, on the interconnecting lever conduit 330 being equal to zero. This rotational balance of the system 300 remains despite changes in the fluid column heights in containers 312, 340 as the interconnecting lever conduit 330 rotates, and at each point or position of rotation of the interconnecting lever conduit 330, prior to any Work Input into the system 300.

Figure 12:
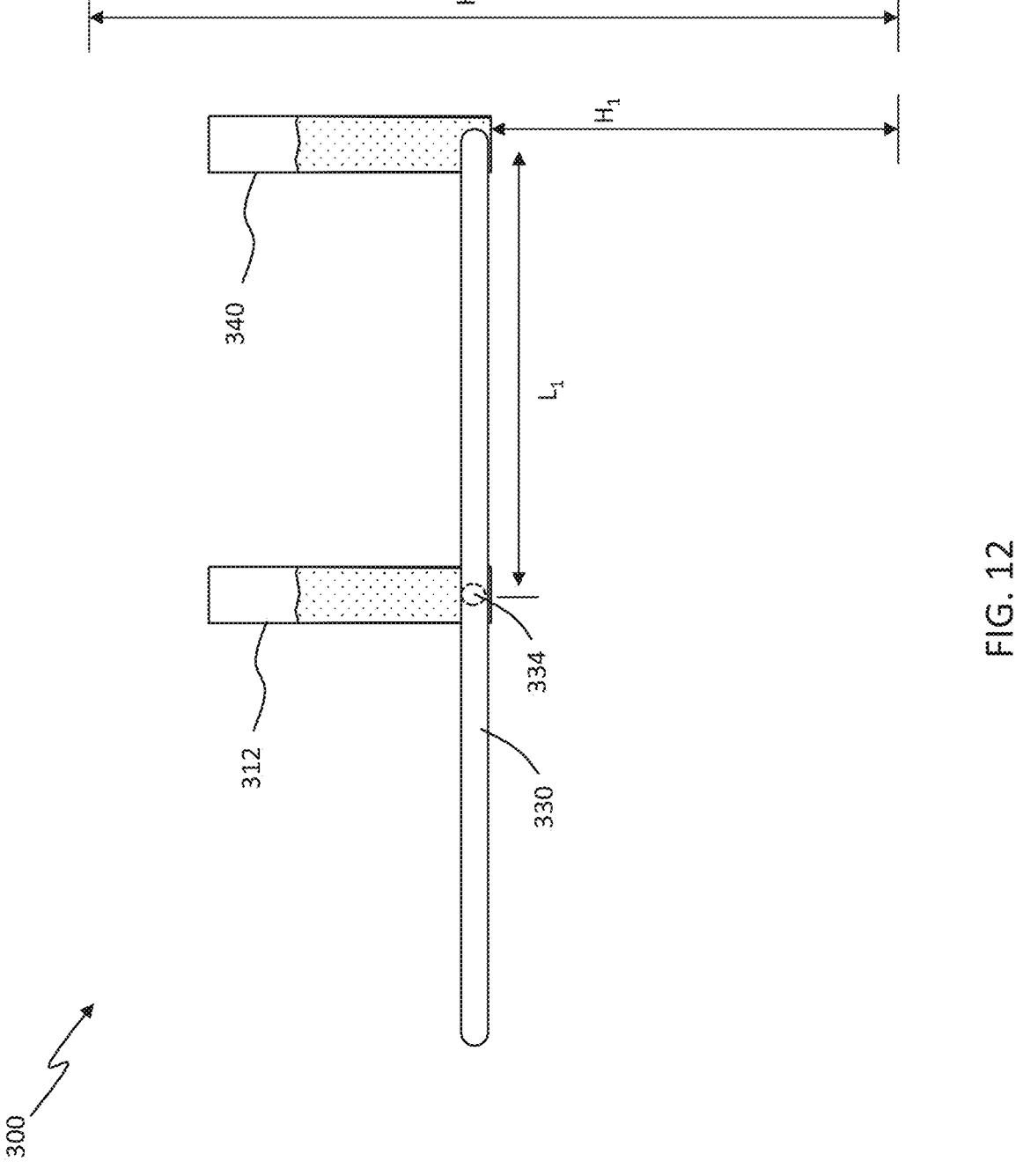
FIGS. 12-16 are schematic front view illustrations of various positions of an engine system with two communicating fluid vessels, in accordance with embodiments of the present disclosure.
Figure 13:
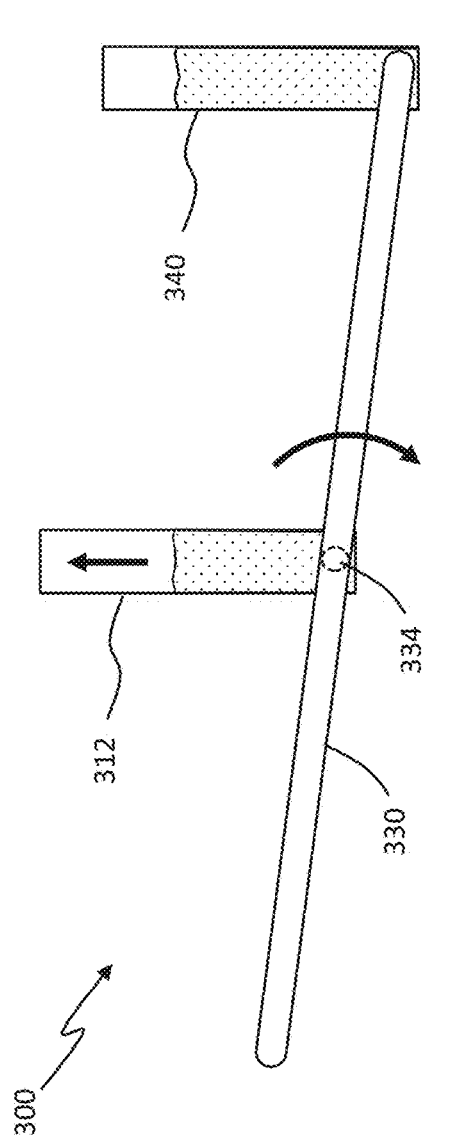
Figure 14:
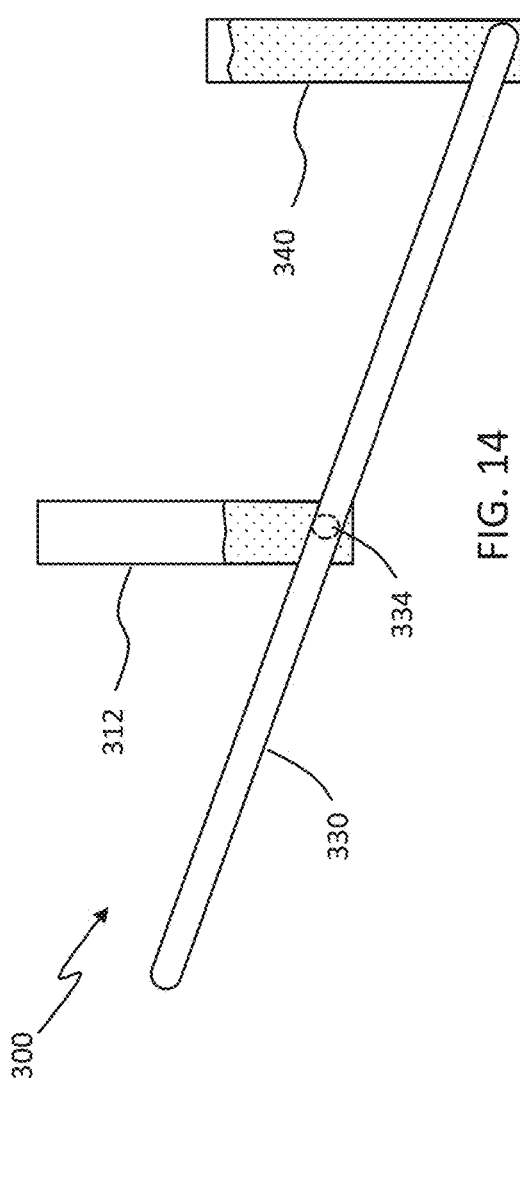

With the system 300 having a rotational balance, and with the containers 312, 340 being fluidly connected, changes in the fluid column pressure of container 312 will cause changes in the fluid mass in container 340. When the change in pressure of container 312 causes an increase in fluid mass in container 340, e.g., by a quantity of fluid successively shifting toward container 312, into the interconnecting lever conduit 330, which shift an equal volume of fluid into container 340, this additional fluid mass will cause an additional downward force at the end of the lever due to the gravitational force acting on an increased mass. For instance, starting at a neutral position as shown in FIG. 12, with the end of the interconnecting lever conduit 330 on which container 340 is located being positioned approximately at the 3 o'clock position, a change to the fluid column pressure of container 312 (as indicated by the solid arrow, where the up arrow indicates an increase if fluid pressure and down arrow indicates a decrease in fluid pressure) will cause fluid to move from the bottom of container 312, into the interconnecting lever conduit 330, which results into a volume of fluid shifting into the bottom of container 340. This additional fluid mass within container 340 will change the balance on the interconnecting lever conduit 330, such that the end of the interconnecting lever conduit 330 with container 340 will exert an additional downward force at this end of the interconnecting lever conduit 330. In turn, this causes rotation of the interconnecting lever conduit 330 about the axis 334, as shown in FIG. 13. The interconnecting lever conduit 330 may continue on a rotational path until it reaches a bottom position, for instance, a position as shown in FIG. 14. Thus, increases of the fluid pressure of container 312 can cause rotational movement by increasing the fluid mass in container 340 to rotate the interconnecting lever conduit 330 downward when the interconnecting lever conduit 330 is at or near the top of its rotation. This increased mass of the fluid in container 340 increases a torque exerted on the interconnecting lever conduit 330.

Similarly, decreasing the fluid pressure of container 312 will decrease the fluid mass in container 340, thereby reducing the downward force at this end of interconnecting lever conduit 330, when the interconnecting lever conduit 330 is at or near the bottom of its rotation. This decreased mass of the fluid in container 340, decreases a torque exerted on the interconnecting lever conduit 330. Since the system 300 is rotationally balanced, these increases or decreases in the fluid pressure of container 312 correspond to increases and decreases of additional fluid mass (beyond the fluid mass that exists in container 340 in the rotationally balanced system 300) draining into or from container 340, which increases or decreases the torque exerted on the interconnecting lever conduit 330.

Figure 15:
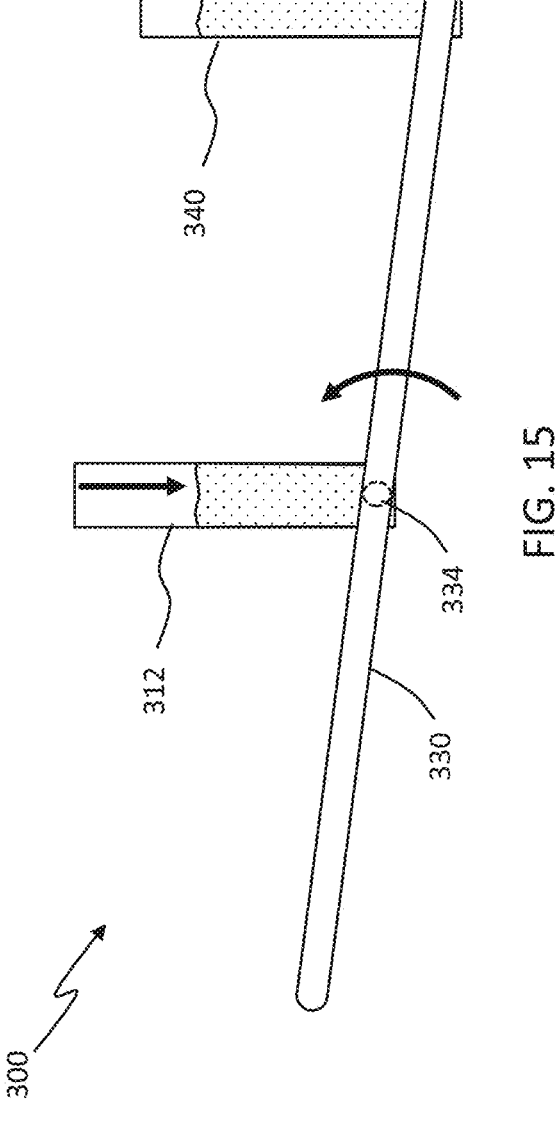

For example, when starting at the bottom position, as shown in FIG. 14, decreasing the fluid pressure in container 312 will cause a volume of the fluid mass from container 340 to move into the interconnecting lever conduit 330, which results in an equal volume of fluid moving from interconnecting lever conduit 330 into container 312, thereby reducing the downward force at the end of the interconnecting lever conduit 330 at which container 340 is positioned. This is depicted in FIG. 15. This reduced downward force at the end of the interconnecting lever conduit 330 returns the system 300 to a rotationally balanced state, where it will remain absent additional forces exerted on it. To raise the end of the interconnecting lever conduit 330 at which container 340 is positioned, an additional unbalancing force may be applied. For example, a counterweight or an additional decrease of pressure or fluid mass can be used to upset the balance of system 300, thereby further decreasing the downwards force at the end of the interconnecting lever conduit 330 where container 340 is located, which can initiate upwards rotation at this location. This rotation may continue until the interconnecting lever conduit 330 is substantially horizontal in the neutral position, as shown in FIG. 12, or to an elevated position depicted in FIG. 16, where container 340 is positioned higher than container 312. The process of moving the interconnecting lever conduit 330 in a rotational manner about axis 334 may continue through one or more cycles or partial cycles, such as between fully raised and fully lowered positions of the container 340, or along a partial rotational path thereof.

Figure 16:
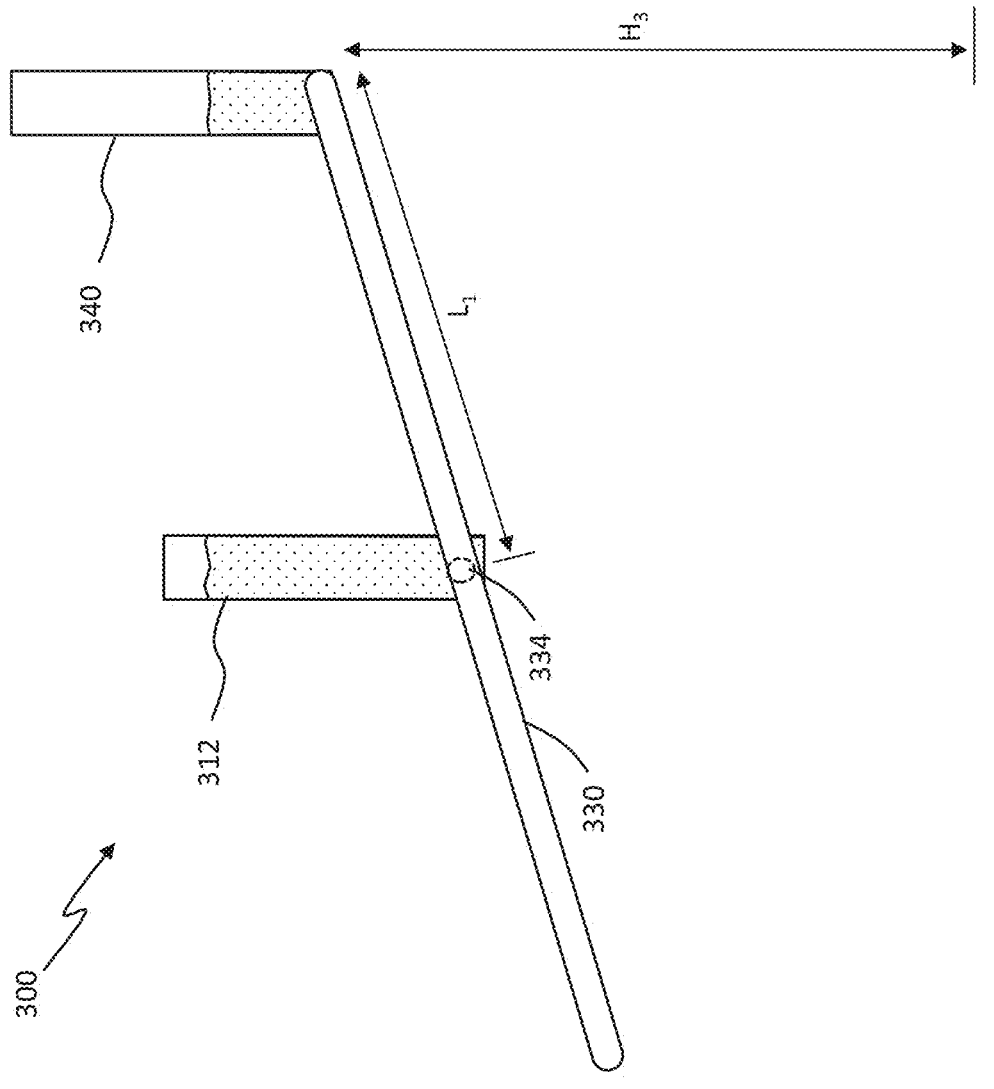
Figure 17:
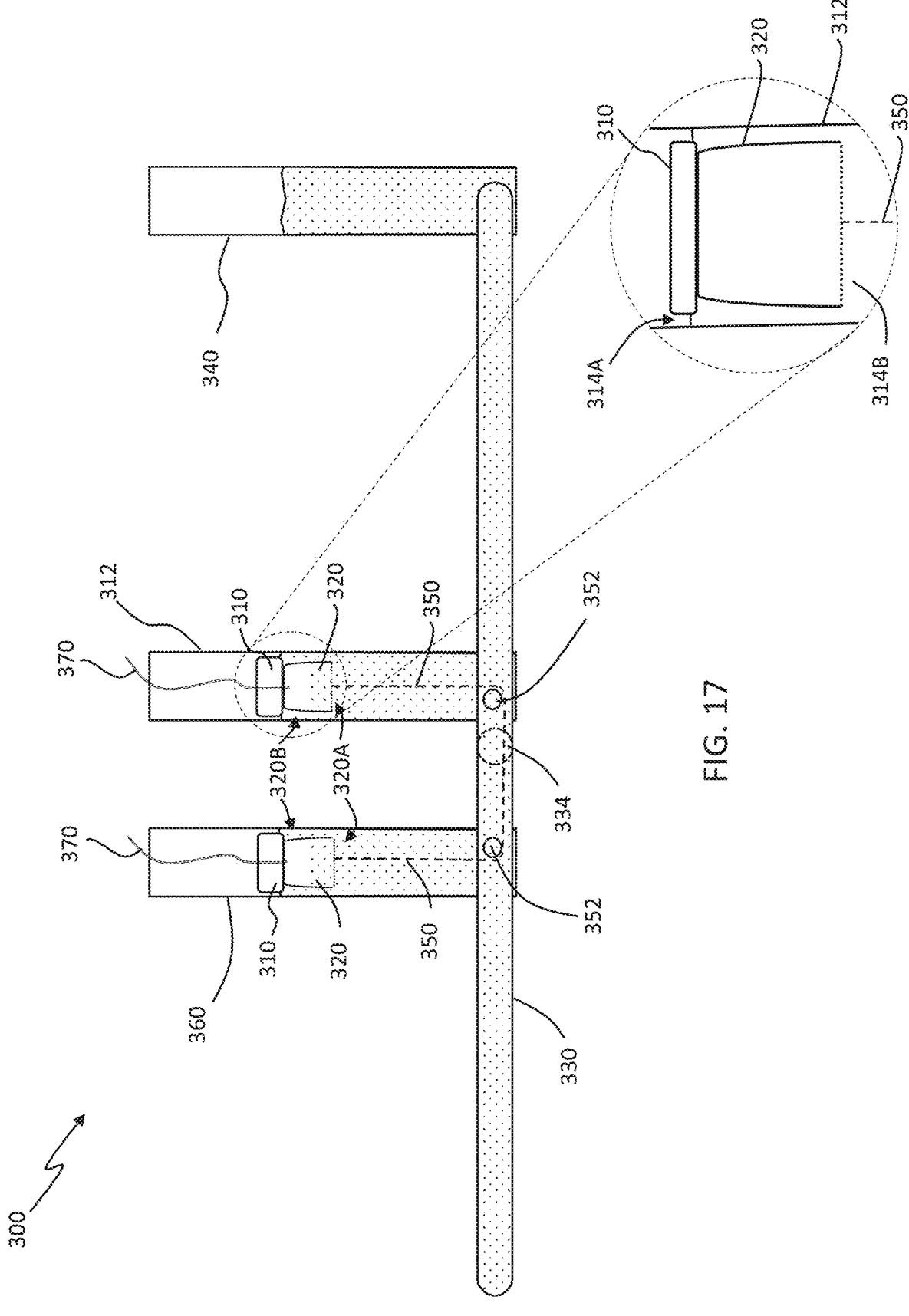
FIGS. 17-18 are schematic front view illustrations of various positions of an engine system with three communicating fluid vessels, in accordance with embodiments of the present disclosure.
Figure 18:
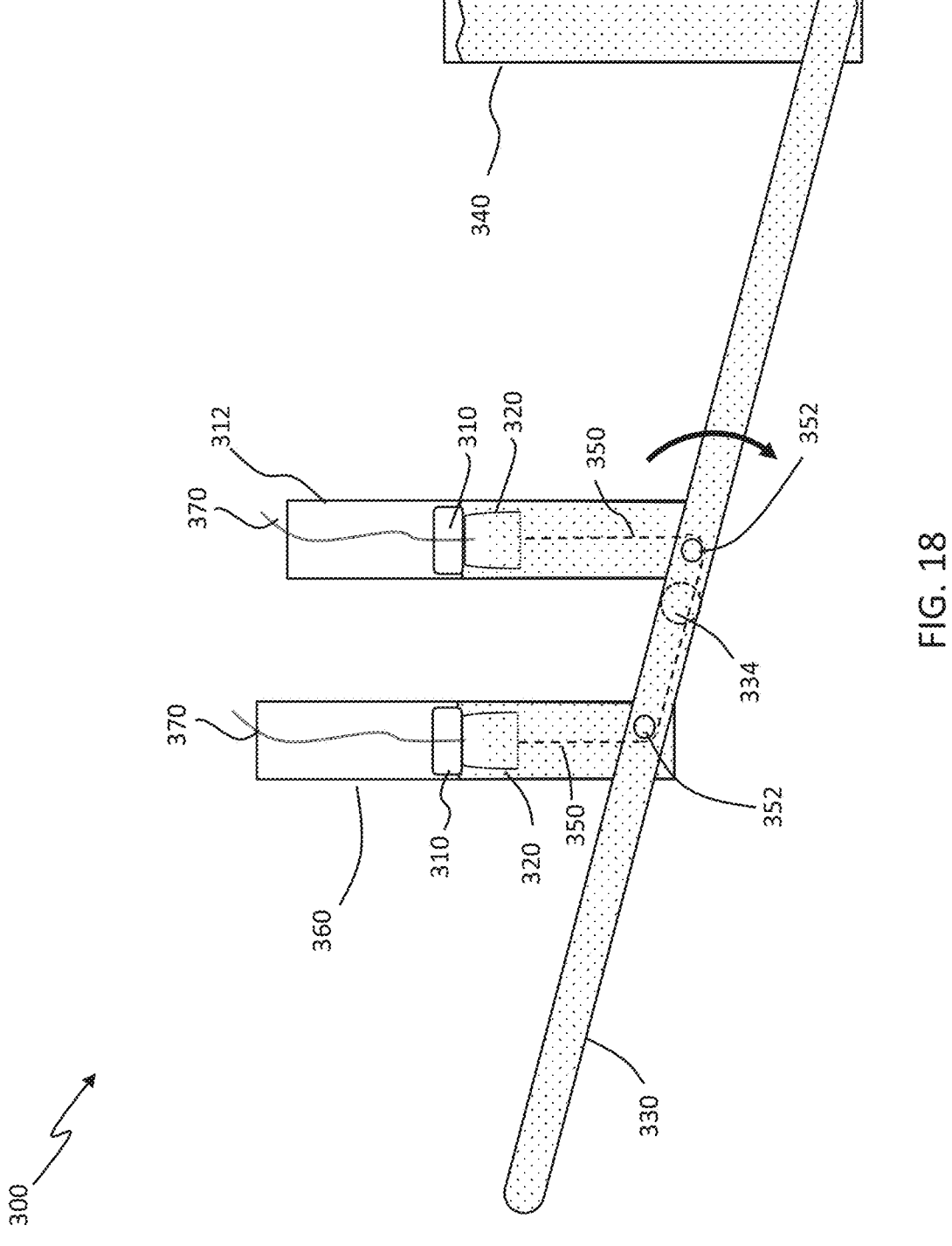

FIGS. 17-18 are schematic front view illustrations of various positions of the system 300, in accordance with embodiments of the present disclosure. Building on the system 300 as described relative to FIGS. 12-16, the system 300 of FIG. 17 includes fluid container 360 having a column of fluid therein. The fluid container 360 is in fluid communication with containers 312, 340 via the interconnecting lever conduit 330. When three containers 312, 340, 360 are used, container 312 may be shifted slightly off axis 334, such as to the right of axis 334, and container 360 may be positioned off axis to the left of axis 334. Container 340 remains at or near a terminating end of interconnecting lever conduit 330. The use of an additional container, e.g., container 360, is to provide a column of fluid for a second holding tank 320 and float 310, in addition to the holding tank 320 and float 310 in the fluid column of container 312. When all three containers 312, 340, 360 are sized and placed on the interconnecting lever conduit 330 properly, such that the system 300 is in rotational balance, the fluid columns in containers 312 and 360 will have corresponding positions. For example, the fluid column in container 312 may rise at the same rate as the fluid column in container 360 falls, as the interconnecting lever conduit 330 rotates downward. As the interconnecting lever conduit 330 rotates upward, the fluid column in container 312 may fall at the same rate as the fluid column in container 360 rises.

Along with the third container 360, FIG. 17 depicts both containers 312 and 360 as having at least one buoyant member or float 310 positioned therein, along with at least one holding tank 320 positioned in containers 312, 360 in a position contacting or connected to, directly or indirectly, the respective float 310 in the container 312, 360. For example, FIG. 17 depicts each holding tank 320 connected to an underside of float 310, which is positioned proximate to the upper surface of the fluid column within each container 312, 360. Each holding tank 320 is characterized as being an open-sided container, where it has a lower portion 320A configured to allow the fluid to pass into and out of an interior of the holding tank 320, and an upper portion 320B that is fluidly sealed. A tether 350 physically links together the holding tanks 320 of each of the containers 312, 360, such that the height position of the holding tank 320 in one container is physically dependent on the height position of the holding tank 320 in the other container. The tether 350 may be positioned along one or more pulley wheels 352 which allow the tether 350 to move along more than two directions, for instance, such that the tether 350 can extend from container 312, through or along interconnecting lever conduit 330, and to container 360. Each of the holding tanks 320 may receive a supply of gas, such as through a tube 370, whereby the supply of a gas is in fluid communication with the interior of the holding tank 320 in one or more of containers 312, 360. A pump, air compressor, or similar device can be used to move gas into and out of one or more of the holding tanks 320.

One way to increase fluid pressure in container 312 is to displace a volume of fluid near the surface of the fluid column in container 312, which would increase the fluid pressure at the bottom of container 312. For instance, assuming the interconnecting lever conduit 330 is in the 3 o'clock position, the fluid pressure at the bottom of container 312 would become greater than the fluid pressure at the bottom of container 340. It is noted that the division between the fluid pressure in container 312 and fluid pressure in container 340 would be at the deepest point of the fluid columns in each container 312, 340, and/or within the interconnecting lever conduit 330 when it is not horizontal, since the interconnecting lever conduit 330 is part of the interconnected fluid system and acts as part of the fluid column in container 312 or the fluid column in container 340, as dictated by the deepest point in the fluid. With the fluid pressure at the bottom of the fluid column in container 312 being greater than the fluid pressure at the bottom of the fluid column in container 340, the fluid in container 312 will seek equilibrium with the lower fluid column pressure of container 340, which will cause the shifting of fluid molecules toward the fluid column in container 340, lifting up and filling in underneath the fluid column in container 340, until equilibrium between the two fluid columns is reached. As such, these new fluid molecules correlate to a new or additional fluid mass which is located at the bottom of container 340. In turn, this new fluid mass at the bottom of container 340 creates a new or additional fluid mass at the top of the fluid column in container 340, which is denoted as Vadditional. This Vadditional represents the fluid mass that is at the top of the fluid column in container 340 after the increase in pressure in container 312, and which was not present in that position in container 340 prior to the increase in pressure in container 312.

By using a holding tank 320, having an open-sided container structure, held just under the surface of the fluid in the fluid column of container 312, it is possible to introduce a supply of gas or low-density fluid, e.g., air, into the holding tank 320 to adjust the fluid pressure within container 312. This is possible since container 312 is closed on all sides and top, but opened at the bottom, such that moving a volume of air into the holding tank 320 will cause a volume of fluid, e.g., water, in the holding tank 320 to flow out of the holding tank 320 and into the surrounding fluid in the fluid column of container 312. This acts to increase the fluid column pressure at the bottom of container 312. And, the opposite is true. By reducing the volume of air in the holding tank 320 by releasing pressure, a portion of the surrounding water in the fluid column of container 312 will flow into the holding tank 320, reducing the fluid column pressure at the bottom of container 312. In seeking equilibrium, this will make the greater fluid pressure at the bottom of container 340 push or lift up fluid in container 312, and fill in underneath the fluid column in container 312, thereby reducing the fluid mass of container 340. Importantly, reducing the fluid mass at the bottom of the fluid column in container 340 would reduce the total fluid mass of the fluid column in container 340, thereby reducing or eliminating Vadditional.

It is also important to maintain the holding tank 320 in a position just under the surface of fluid column in containers 312, 360, despite changes in the height of the fluid columns therein, from changes in elevation of the container 340 at the end of the interconnecting lever conduit 330 as it rotates downward and upward. It may be ideal for the holding tank 320 to maintain a position just under the surface of the fluid. For one, this positioning would take less added work to move a volume of air into the holding tank 320 held just under the surface, as opposed to a position where the holding tank 320 is closer to the bottom of the fluid column, because of the lower surrounding water pressure. Additionally, this position of the holding tank 320 just under the surface of the water in the fluid column of container 312 would be ideal to limit or prevent the reduction of displacement of water by the air in the holding tank 320 because of the holding tank 320 breaching the surface of the water as it became more buoyant when air moved into it. Moreover, it is ideal to maintain the proper position of the holding tank 320 with using little to no work from the Output Work of the interconnecting lever conduit 330.

The holding tank 320 can be maintained in position within container 312, even as the height of the fluid column in container 312 rises and falls as the interconnecting lever conduit 330 rotates, by use of the third container 360, in fluid communication with containers 312, 340 via the interconnecting lever conduit 330, where third container 360 which uses a holding tank 320 within the fluid column in container 360. FIG. 18 illustrates the system 300 with a rotation of the interconnecting lever conduit 330, relative to the neutral position in FIG. 17. Both holding tanks 320 in containers 312, 360 are connected to floats 310 at or near the top of the holding tanks 320, thereby allowing the holding tanks 320 to maintain upward buoyancy and to crowd out the surface area of both the fluid columns in both containers 312 and 360. As illustrated in the detailed section of FIG. 17, the position of the float 310 is at or proximate to the surface 314A of the fluid in the fluid 314B within container 312, such that the holding tank 320 is maintained within the fluid 314B but at a position at or near the surface 314A.

The combination of the float 310 and the holding tank 320 in each container 312, 360 are connected by the tether 350. The tether 350 is a fixed length, and runs through a pulley system having the pulley wheels 352. The direction of movement of the tether 350 can follow a path of the pulley wheels 352. The tether 350 is connectable to both holding tanks 320 in containers 312, 360 and can correspond to movement of one container relative to the other. Thus, as the fluid column heights in containers 312, 360 are increased and decreased, such as when the interconnecting lever conduit 330 is rotated downward and upward, the tether 350 with pulley wheels 352 compensate for the different rates that each fluid column rose and fell, which allows for keeping both floats 310 and holding tanks 320 in their proper positions. As the lever rotates, the work to keep both holding tanks 320 and their floats 310 in the proper position as each fluid column in container 312 and 360 rises and falls in opposite direction to each other, is achieved by the changing buoyant forces of each holding tank 320 and float 310 tethered together, not by the output of the interconnecting lever conduit 330.

The floats 310 and tether 350 are useful in keeping the holding tanks 320 in the desired position as the fluid columns rise and fall. In more detail, as air is moved into both holding tanks 320, they become more buoyant in their surrounding fluid. Ideally, the float 310 and holding tank 320 combination found in each fluid column of containers 312, 360 will maintain their positions with respect to the original surface of the fluid column (before any air is moved into the holding tanks), even with changes in their buoyancy and even as the fluid columns rise and fall with changes in the volume of fluid found in each fluid container 312, 360. The use of the third container 360 allows the fixed length tether 350 holding the two floats 310 and the two holding tanks 320 to keep them in their proper positions as the interconnecting lever conduit 330 rotates upward and downward.

The fixed length tether 350 connected to both holding tanks 320 compensates for changes in the heights of the fluid columns in containers 312, 360 which occur at different rates. Since fluid containers 312, 360 are on different sides of the axis 334 of rotation of the interconnecting lever conduit 330, as container 312 falls, and the fluid column height of container 312 rises, container 360 rises, and the fluid column height of container 360 falls. The individual dimensions and the position from the axis 334 of each fluid column in containers 312, 360 will determine the height of each fluid column at each position in the rotation. By matching the pulley system, such as by using different size pulley wheels 352 to the rate of increase and decrease of fluid column heights of containers 312, 360, the pulley system can keep the holding tanks 320 in their desired position as the interconnecting lever conduit rotates upward and downward.

It is further noted that in the example depicted in FIGS. 17-18, the pulley system having pulley wheels 352 is used to compensate for the relative positions of the floats 310 and holding tanks 320 of containers 312, 360. This compensation is due to the fact that at the position that container 360 and container 312 reside, the fluid in one container does not fall at the same rates as the fluid in the other container rises. However, relationship is linear, such that the pulley system can compensate for this deviation in relative position change. For instance, the deviation may be, in one example, 3-to-1, such that a pulley system with a 3-to-1 compensation can be applied.

Another benefit of the use of the holding tanks 320, floats 310, pulley wheels 352, and tether 350 is to maximize, and ideally maintain, the amount of displaced fluid that moved to the end of the interconnecting lever conduit 330. Displacing fluid in a communication vessel causes the fluid column heights in each fluid column to increase, with a volume of fluid moving to the top of each fluid column in proportion of its surface area to the available surface areas of all fluid columns. Therefore, adding the float 310 and holding tank 320 to each container 312, 360 to crowd out almost all of the surface area of the fluid columns in containers 312 and 360 will cause a greater volume of fluid to move to the fluid column in container 340 at the end of the interconnecting lever conduit 330, as fluid is displaced from the holding tanks 320. As fluid is displaced from the interior of the holding tanks 320, and as air is moved into the holding tanks 320, an amount of fluid equal to the displaced fluid fills in above the surface of each fluid column in proportion to the available surface areas of each fluid column, until equilibrium is reached when the tops of all fluid columns are at equal elevation.

Figure 19:
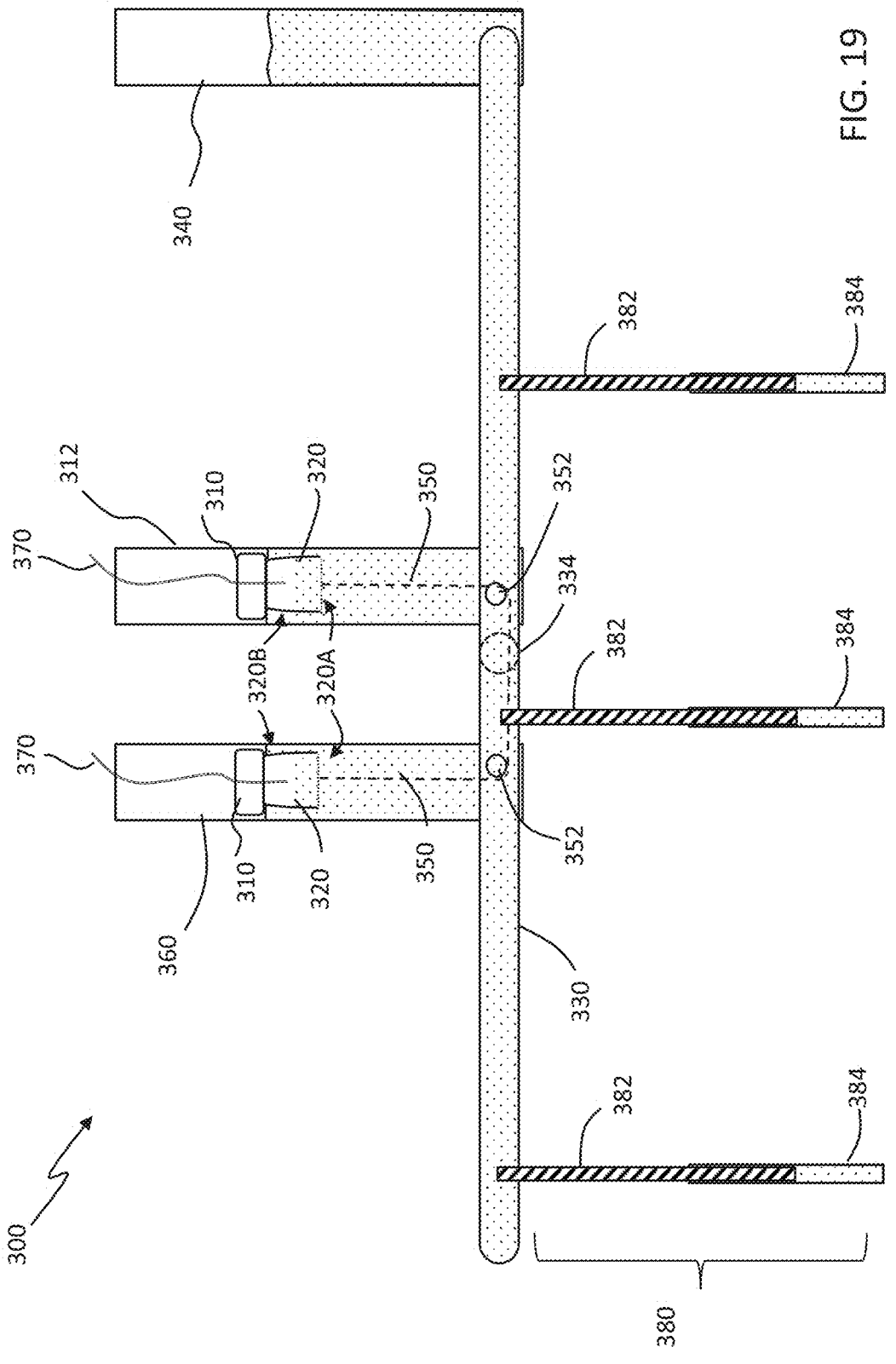
FIGS. 19-20 are schematic front view illustrations of various positions of an engine system with three communicating fluid vessels and a fluid rod and container system, in accordance with embodiments of the present disclosure.
Figure 20:
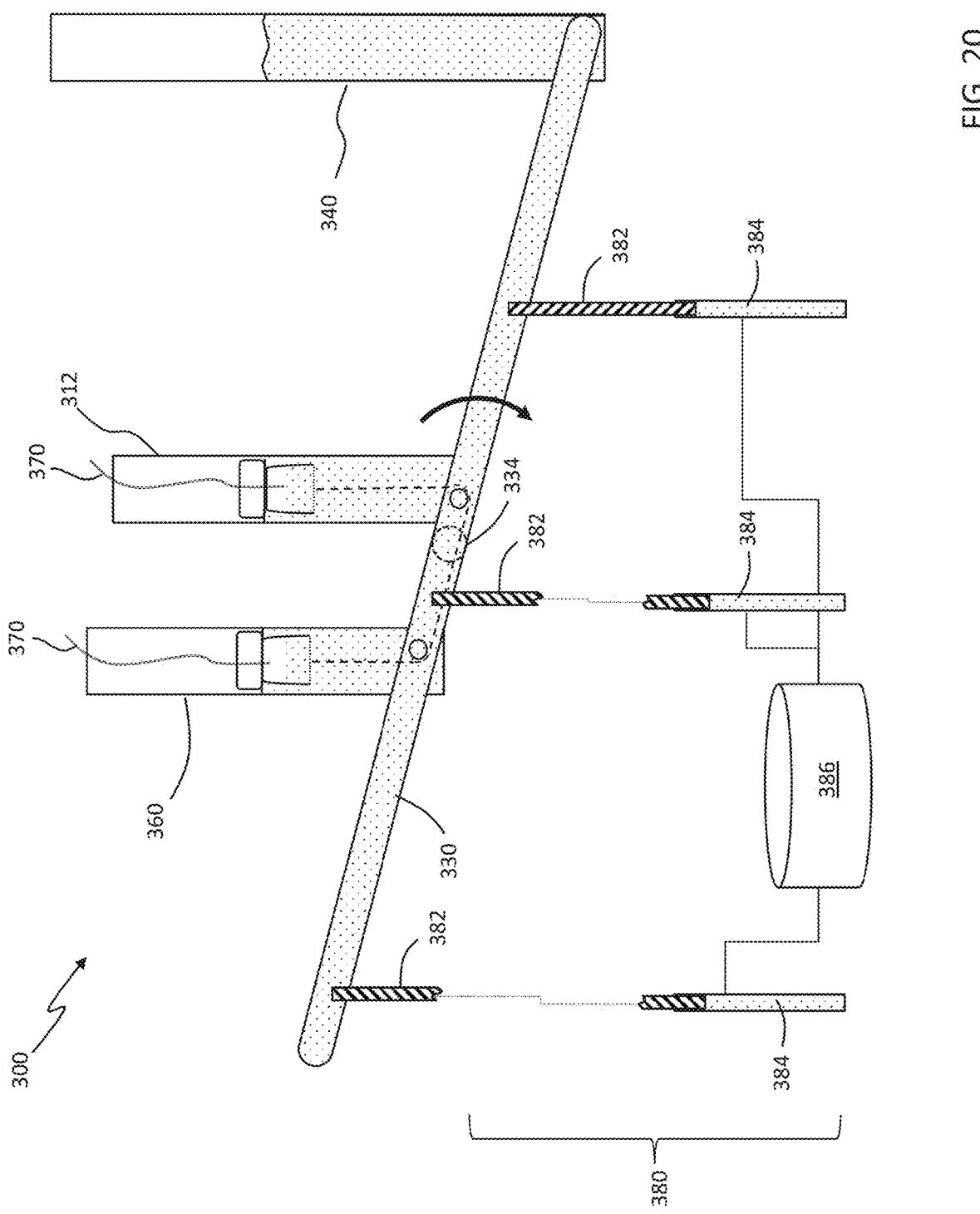

FIGS. 19-20 are schematic front view illustrations of various positions of the system 300 and a fluid rod and tank system 380, in accordance with embodiments of the present disclosure. The fluid rod and tank system 380 may be used to help maintain the rotational balance of the system 300 before any air is moved into the holding tanks 320. The fluid rod and tank system 380 may have at least one fluid rod 382 suspended from the interconnecting lever conduit 330, and a corresponding tank 384 positioned below fluid rod 382. The corresponding tank 384 has a fluid therein, and may include a tank which is sized to receive only the fluid rod 382, or it may be an elongated, trough size, which allows the corresponding tank 384 to receive the fluid rod 382 as its lateral position changes due to rotation of the interconnecting lever conduit 330. Pivotal movement of the interconnecting lever conduit 330 causes the fluid rod 382 to move relative to the fluid in the corresponding tank 384. The fluid in the corresponding tank 384 and the fluid rod 382 may have the same density, such that the portion of the fluid rod 382 submerged within the fluid in corresponding tank 384 achieves neutral buoyancy.

It is noted that the fluid rods 382 may have a density which differs from the fluid in the corresponding tank 384, but where the position of the fluid rods 382 relative to the corresponding container 312, 340, 360 that they are offsetting is adjusted. For instance, a fluid rod 382 which is twice as dense as the fluid may be moved halfway closer to the axis of rotation 334 to achieve the desired balance. Additionally, other changes to the use of the fluid rod and tank system 380, including the size of components, the density of components, and/or the position of components may be selected or employed to accommodate the changes in weight as the system 300 moves.

It is important that the system 300 maintain its rotational balance, that its net rotational forces, e.g., net torque, equals zero at every degree in the rotation, both falling and rising rotational movements, and before Input Work is added to increase and decrease the fluid column pressure of containers 312, 360. However, it can be a challenge keeping the system 300 rotationally balanced as the interconnecting lever conduit 330 rotates downward, since containers 312 and 340 take in fluid, and container 360 gives up fluid. Similarly, the challenge exists as the interconnecting lever conduit 330 rotates upward, where containers 312 and 340 give back fluid while container 360 takes in fluid. Therefore, at each point in the rotation, both upward and downward, each fluid column in each container 312, 340, 360 gains and loses downward force, from changes in the volume of their fluid mass.

Since the system 300 is rotationally balanced, the fluid rod and tank system 380 may provide solutions to these challenges by adding weights in the form of fluid rods 382 with fluid rods 382 and tanks 384 on the opposite side of the interconnecting lever conduit 330 from the fluid columns of containers 312, 340, 360, respectively, and when the fluid rods 382 have a density which matches or substantially matches fluid within the tanks 384. Submerging a mass into a fluid of the same density cancels out the upward buoyant forces from the downward forces from gravity for that portion of the mass submerged. Therefore, it is desirable to use fluid rods 382, fluid in the tanks 384, and fluid in the containers 312, 340, 360, and interconnecting lever conduit 330 which are all the same density, whereby the size and placement of the fluid rods 382, and their corresponding tanks 384, can be selected to offset the force from the fluid within containers 312, 340, 360.

Accordingly, the rod and tank system 380 may assist with offsetting changes in the fluid mass in containers 312, 340, 360, as the fluid drains between the containers 312, 340, 460 and through interconnecting lever conduit 330. The use of the fluid rods 382 is calibrated to the degree of movement of the interconnecting fluid conduit 330. For instance, if the interconnecting fluid conduit 330 lowers by 1 degree, the corresponding fluid rod 382 on the opposing side of the axis raises 1 degree. Since the fluid rods 382 have the same density as the fluid within the corresponding tank 384, and the fluid rods 382 have the same diameter as the diameter of the corresponding tank 384 holding the fluid, the fluid rods 382 will apply an equal amount of offsetting force as the interconnecting fluid conduit 330 is moved up and down.

An example of this arrangement in operation is depicted in FIG. 20. As the interconnecting lever conduit 330 rotates downward, the fluid column mass of container 340 increases, and thus, the downward force on the interconnecting lever conduit 330 at its position from the axis 334 increases. A fluid rod 382 with corresponding tank 384 can be placed on the opposite side of the axis 334 of the interconnecting lever conduit 330, such that the fluid rod 382 will rise out of its tank 384 and apply an equal amount offsetting weight (downward force) to offset the increasing weight applied by the fluid column in the container 340 on the other side of the interconnecting lever conduit 330. The same arrangement can be made for all containers in the system 300 which are carried by the interconnecting lever conduit 330. By increasing and decreasing the downward forces on both sides of the interconnecting lever conduit 330 at the same rates and at the same distance from the axis 334, the interconnecting lever conduit 330 remains rotationally balanced before any air is moved into the holding tanks 320 found in containers 312, 360.

During rotation of the interconnecting lever conduit 330, the fluid rods 382 will move between partially submerged positions in the fluid of tanks 384, whereby at least a portion of the fluid rod 382 will remain in contact with the fluid within a corresponding tank 384. It is noted that the figures depict the fluid rods 382 not to scale and with a break, which indicates that the fluid rods 382 may be various lengths in order to remain in contact with the fluid. It is undesirable for the fluid level within tanks 384 to vary significantly, including based on displacement of fluid due to the fluid rods 382. As such, an enlarged fluid reservoir 386 with interconnecting feeder tubes may be used to fluidly connect to the tanks 384, such that the fluid level within tanks 384 remains substantially constant.

Figure 21A:
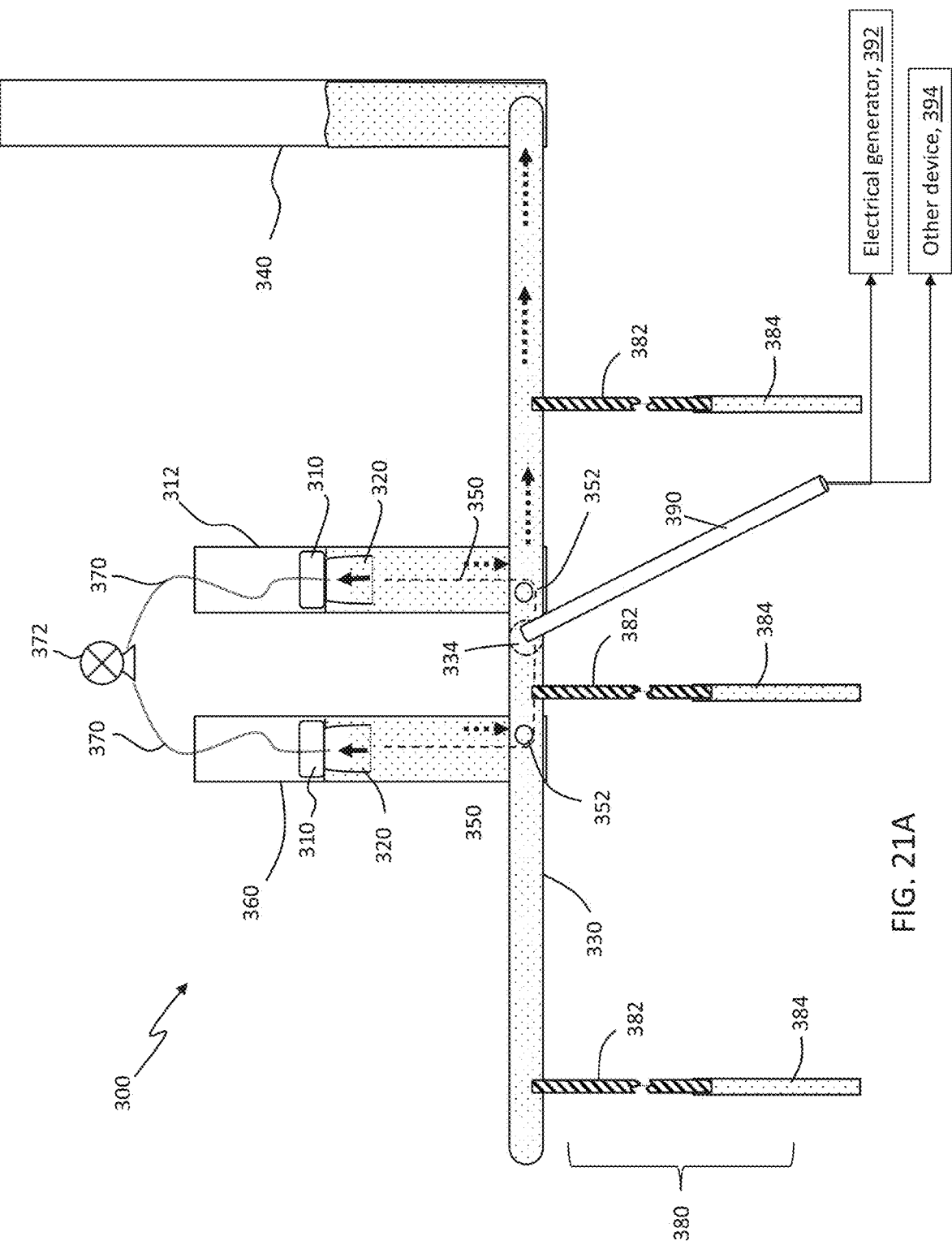
FIG. 21A is a schematic front view illustration of an engine system with three communicating fluid vessels and a fluid rod and container system showing initial operation thereof, in accordance with embodiments of the present disclosure.
Figure 21B:
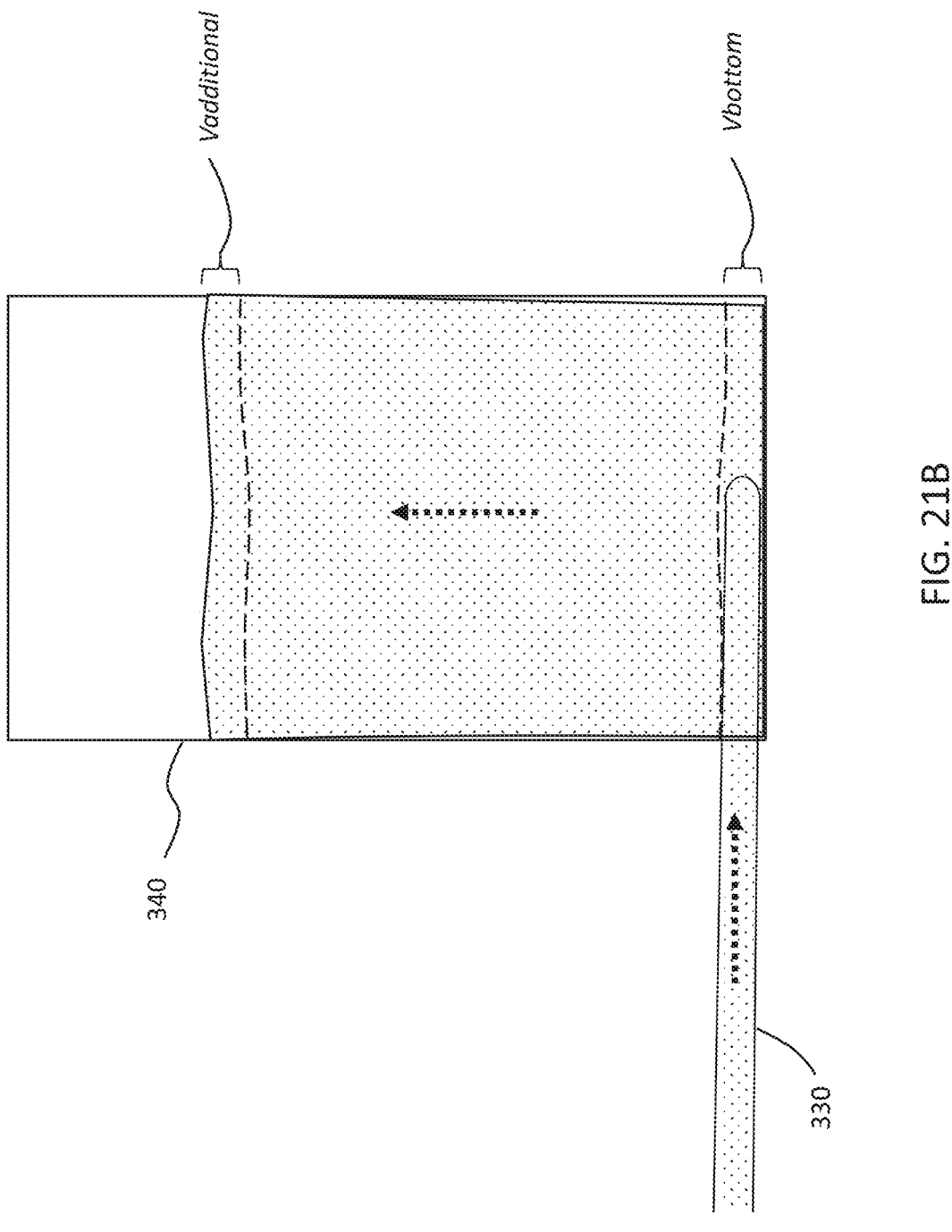
FIG. 21B is a detailed schematic front view illustration of a third fluid container of the engine system with three communicating fluid vessels of FIG. 21A, in accordance with embodiments of the present disclosure.

Operation of the system 300 is described relative to FIGS. 21A-21F, of which, FIG. 21A is a schematic front view illustration of the system 300 showing initial operation thereof, FIG. 21B is a detailed schematic front view illustration of a third fluid container 340 of the system 300, and FIGS. 21C-21F are schematic front view illustrations of various positions of the system 300.

The system 300 uses several principles to achieve operation. One such principle is based on the interplay between the use of offsetting forces using mass and a part, or sub-system, of this mass system, that makes use of offsetting forces utilizing fluid pressure. As is common knowledge, weight is typically downward toward the pull of the force of gravity acting on a mass, which is expressed as weight (W) which is equal to mass (M) times the acceleration of gravity (G), e.g., $W=MG$. Also known is the relationship between the force due to pressure relative to an area, where the force (F) is equal to pressure (p) times the area (A) over which pressure is exerted, e.g., $F=pA$. The system 300 uses an interplay between principles of weight and a changing mass, and forces from pressure, in particular, controlled pressure changes to shift weight between a region of higher-pressure to a region of lower-pressure, independent of direction. When applied to a rotationally balanced system which has a controlled operation, these forces can be used to generate a rotational output.

The system 300 may be understood as a communicating vessel/lever system which is formed from two conceptual sub-systems, cooperating and working together: (1) the lever or lever system, which is based upon offsetting forces using mass, and (2) the communicating vessel or communicating vessel system which is the system using offsetting forces based upon fluid pressure. Both of these subsystems can be implemented with the structures discussed relative to FIGS. 12-20, including the containers 312, 340, 360, the interconnecting lever conduit 330, and other components discussed.

With regards to fluid in the communicating vessel, changes in fluid pressure in one fluid column contained within a container will change the amount of fluid mass in the other fluid column in another container, while, at equilibrium, maintaining the offsetting fluid column pressures inherent in the communicating vessel. Even with the shifting of mass, that is fluid mass, from one container of the communicating vessel to the other container on the opposite side of the communicating vessel, at equilibrium, the offsetting forces of the fluid pressures within the communicating vessel remain. But this is not true with a balanced system based on mass, much like a balanced seesaw, since shifting of mass from one side of a lever to the other side will upset the offsetting forces of a balanced system based upon mass.

Additionally, the system 300 relies on the concept that work added to the system 300, Work Input, can be used to shift a volume of fluid into and out of the bottom of a fluid column in the communicating vessel, and which can be used to create Work Output, by using an equal volume of fluid at the top of the fluid column. This shift between the bottom of the fluid column to the top of a fluid column occurs due to an equal volume of fluid which continually shifts the volume of fluid from one column to the other, e.g., the shift of fluid that occurs from the dispersion and distribution of fluid molecules between positions in the locations between the bottom of containers 312, 360, through the interconnecting lever conduit 330, toward and into container 340. The system 300 uses the height difference, that is the gravitational potential energy (GPE) difference, between the additional fluid mass at the bottom of the fluid column, and an equal amount of fluid mass at the top of the fluid column, less the Work Input, to operate the communicating vessel/lever system and generate Work Output.

It is noted that the GPE difference may ideally be matched to the system 300 based on a length of the interconnecting lever conduit 330 and a size of the containers 312, 340, 360. For instance, as shown in FIG. 12, when the system 300 is in rotational balance with fluids in containers 312, 340, and at the 3 o'clock position, the distance that the fluid mass in container 340 can fall when Vadditional is added to container 340 is denoted by height, $H_1$, which is equal to the length, $L_1$, of the interconnecting lever conduit 330 from the axis 334 to container 340. Thus, the maximum distance that container 340 with Vadditional can fall in system 300 is understood to be twice $H_1$, e.g., when container 340 is moved from a top position with the interconnecting lever conduit 330 at the 12 o'clock position, to a bottom position where the interconnecting lever conduit 330 is at the 6 o'clock position. This height is depicted in FIG. 12 as $H_2$.

The length of the interconnecting lever conduit 330 can affect the GPE utilized by the system 300, since the length is correlated to the height that the container 340 can be moved. For instance, by doubling or tripling the length of the interconnecting fluid conduit 330, all while leaving the starting fluid column heights in containers 312, 340 the same would act to double or triple the distance that Vadditional could fall, thereby greatly increasing the output at the axis.

The GPE of Vadditional on a higher starting fluid column is greater than in a lower starting fluid column, and the system 300 may use interconnecting lever conduit 300 which is designed to start the fluid column with a sufficient height to capture the greatest GPE from Vadditional without experiencing negative situations, such as running dry of fluid in a container. The length of the interconnecting lever conduit 330 can dictate the total height that container 340 can fall, and thus correlate to the GPE which can be utilized by the system 300. To this end, an ideal system 300 may maximize the GPE achieved from Vadditional by matching the total height, $H_2$, to be approximately twice the length, $L_1$, between the axis 334 and container 340. With these relative dimensions, the total possible GPE available from Vadditional in container 340 may be achieved.

Further, starting the fluid column height of container 340 with a greater vertical distance creates more GPE in the Vadditional in container 340 without adding more Input Work, since the offsetting fluid column pressure between columns 312 and 340 balances the system 300, and draining at least a portion the fluid pressure in container 312, for instance, can be used to remove Vadditional from the fluid column in container 340, thereby allowing the system 300 to change from an unbalanced system to a rotationally balanced system, or beyond, e.g., the system 300 may be unbalanced to cause a clockwise rotation from the 1 o'clock position downwards to the 5 o'clock position, where it changes to being unbalanced to cause a counter-clockwise rotation upwards from 5 o'clock to the 1 o'clock position, where it then can achieve rotational balance again. For instance, as shown in FIG. 16, as compared to FIG. 12, the system 300 in the position of FIG. 16 can achieve a greater GPE from Vadditional in container 340 due to the higher position of the container 340, denoted by $H_3$, which is greater than $H_1$ but less than $H_2$, where this higher position is due to the increased length of the interconnecting fluid conduit 330. Accordingly, at the same clock position, an interconnecting lever conduit 330 with a greater length will result in a greater height distance, thus increasing the potential Work Output without increasing the Work Input.

There are, of course, other designs where different dimensions of these structures may be used or chosen, and where the GPE achieved from Vadditional is less than a possible maximum, but still achieves operational parameters of the system 300, all of which are considered within the scope of the present disclosure. For instance, there may be spatial parameters which dictate the practical size of the containers 340 or the interconnecting lever conduit 330, such as the footprint of an installation location. There are also situations where less than the maximum possible GPE may be used in order to prevent the system 300 from reaching an undesirable position, such as where on container is located to fully drain all fluid into another container and runs dry.

With reference to FIGS. 21A-21F, and starting with FIG. 21A, the system 300 starts in rotational balance about axis 334 of the interconnecting lever conduit 300. The fluid pressure in the fluid column of container 312, which is located close to axis 334, is increased. The increase in fluid pressure occurs, ideally, near the surface of the fluid within container 312, and may be achieved with a pump 372 or similar device, which is capable of moving a low-density fluid, such as air, into and out of the holding tank 320 in container 312. The same process can be used for container 360 which is located offset from axis 334, on an opposing side of axis 334 from container 312. In comparison to the system 100 described relative to FIGS. 5-11, which relies on 360° rotational movement and a single holding tank within a container, the use of two containers 312, 360, each with a holding tank 320, allows for the displacement of a greater volume of fluid with the same amount of work. Since work (W) is equal to fluid pressure (p) times the displaced volume (delta_V) (W=p delta_V), the closer to surface that the fluid is displaced, there is less pressure, such that there is less Input Work needed.

Moving air into the two holding tanks 320 displaces the fluid in the holding tanks 320, which forces the fluid into the surrounding fluid column within the containers 312, 360, thereby increasing the surrounding fluid pressure within containers 312, 360. Notably, since the upper portions 320B of the holding tanks 320 in containers 312, 360 are fluidly sealed to an outside environment, increasing the fluid pressure in the holding tanks 320 near the surface of the fluid columns in containers 312 and 360 will increase the fluid pressure at these bottom of fluid columns. Since pressure seeks equilibrium, a portion of the fluid within containers 312, 360 will exit at the bottom of those containers 312, 360, shifting into the interconnecting lever conduit 330, which in turn causes a volume of fluid to enter the bottom of container 340, since container 340 has a lower pressure than containers 312, 360.

The fluid entering container 340 will lift up and fill in underneath the fluid column in container 340, thereby creating additional fluid molecules at the bottom of the fluid column in container 340, which is understood as Vbottom. FIG. 21B illustrates a detailed view of container 340, which depicts Vbottom. Importantly, to the casual observer who compares the communicating vessel both before and after these additional Vbottom fluid molecules are added at the bottom of the fluid column in container 340, it may appear that the additional fluid molecules, e.g., additional fluid mass from these molecules, were added at the top of the fluid column in container 340, which is understood as Vadditional. Vadditional is formed from the fluid mass at the top of the fluid column in container 340 before an equal amount of fluid mass was shifted into the bottom of the fluid column in container 340, which is caused by the increased pressure in holding tanks 320 in containers 312, 360.

It is understood that the Work Input caused new fluid mass to be added to the bottom of the fluid column in container 340 (Vbottom), and this shifting of additional fluid mass into the bottom of container 340 was needed for the fluid in the communicating vessel to obtain fluid pressure equilibrium. Since the system 300 is a rotationally balanced lever, a shift in mass or an additional mass acting on the interconnecting lever conduit 330 (at a point not directly above the axis 334), i.e., from the movement of fluid to container 340, causes an unbalancing of the system 300. This additional fluid mass has additional GPE that upsets the rotationally balanced system, and it is this additional fluid mass that rotates the interconnecting lever conduit 330 downwards.

Work Input equals the change in potential energy of the fluid in the communicating vessel. Since the fluid columns are generally vertical in nature, adding fluid mass to the bottom of a fluid column in the communicating vessel, makes available to the rotationally balanced lever system an equal volume of fluid mass anywhere, that is at any height, within the fluid column. Reconfiguring the communicating vessel/lever system to take advantage of the fluid mass at or near the top of the fluid column, Vadditional, allows the use of a greater amount of GPE to rotate the lever, than if the lever utilized the additional fluid mass of Vbottom. As such, the Work Input shifts additional fluid mass to the bottom of a fluid column in the communicating vessel system, but the Work Output can be achieved using an equal volume of fluid mass at the top of the fluid column. Vbottom is required to maintain offsetting fluid pressures of the fluid in the communicating vessel, but with respect to the lever system, Vbottom is additional fluid mass, that is fluid mass not needed to maintain the rotational balance of the lever system. The fluid mass of Vbottom can be used by the lever system to rotate the lever downward, but by reconfiguring the lever system to use Vadditional, increases the possible Work Output of the system.

The Work Output of the system 300 may be used for any purpose desired. For instance, in one example, the system 300 may utilize a rotatable shaft 390 which is positioned to receive rotational motion from axis 334, or otherwise mechanically connected to the system 300 to receive rotational motion. The rotatable shaft 390 can be used, for instance, to provide rotational energy to an electrical generator 392 which can convert the rotational energy into electrical energy. Similarly, the rotatable shaft 390 can be used to output rotational energy to other devices 394, such as to any mechanical system, e.g., industrial machinery, water pumps, or the like.

As previously noted, and as depicted in FIG. 21A, before any air is moved into the holding tanks 320 of containers 312, 360, and thus, before there is any shift of fluid mass in the system 300, the system 300 is rotationally balanced at each position in its rotation. A rotationally balanced system can be achieved with a precise spatial arrangement of the components of the system to achieve balance about the axis 334 of rotation, whereby unbalancing of the system 300, or disrupting the balance, can be precisely achieved through the introduction of changes in fluid pressure into the system 300.

Figure 21C:
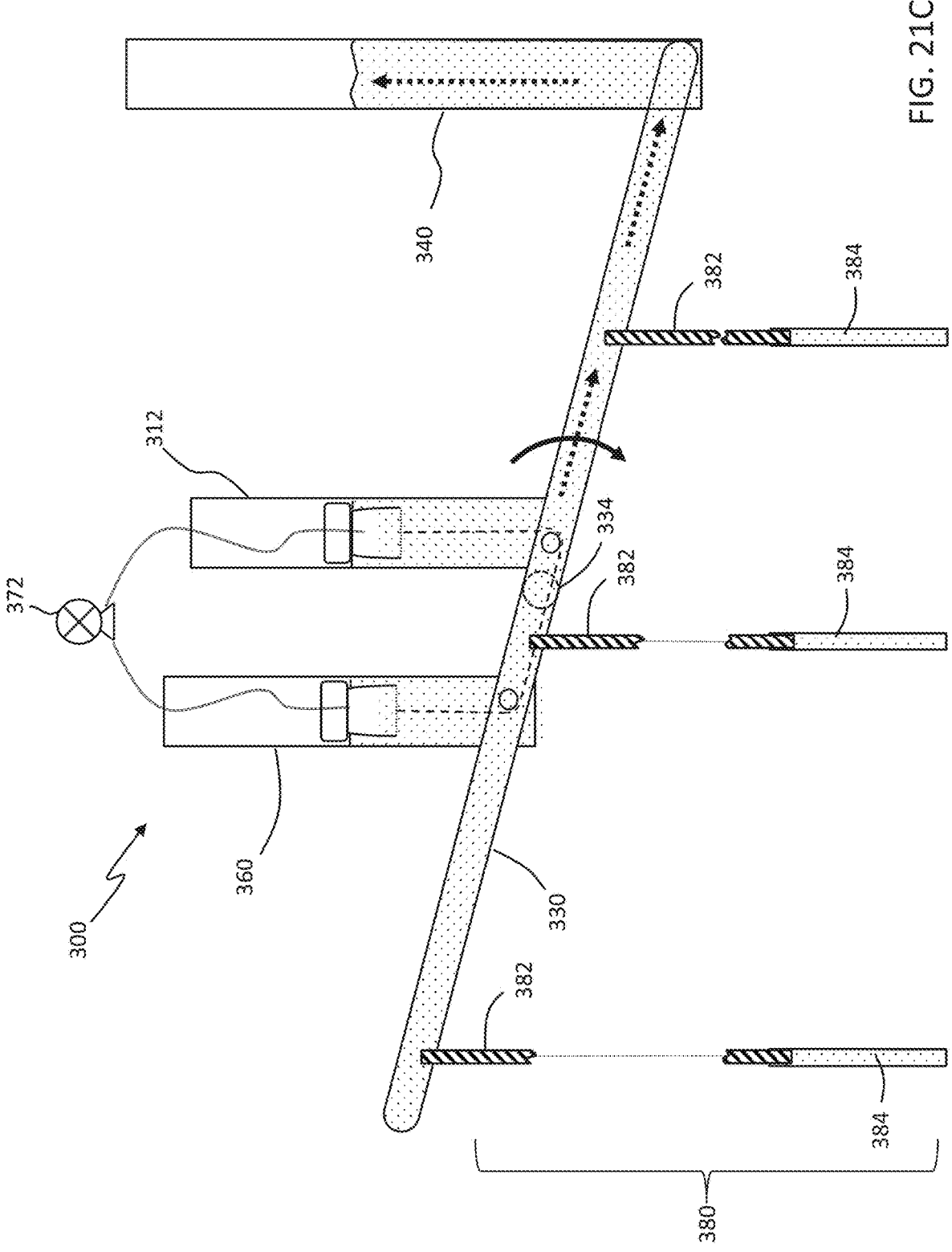
FIGS. 21C-21F are schematic front view illustrations of various positions of the engine system with three communicating fluid vessels and a fluid rod and container system of FIG. 21A, in accordance with embodiments of the present disclosure.
Figure 21D:
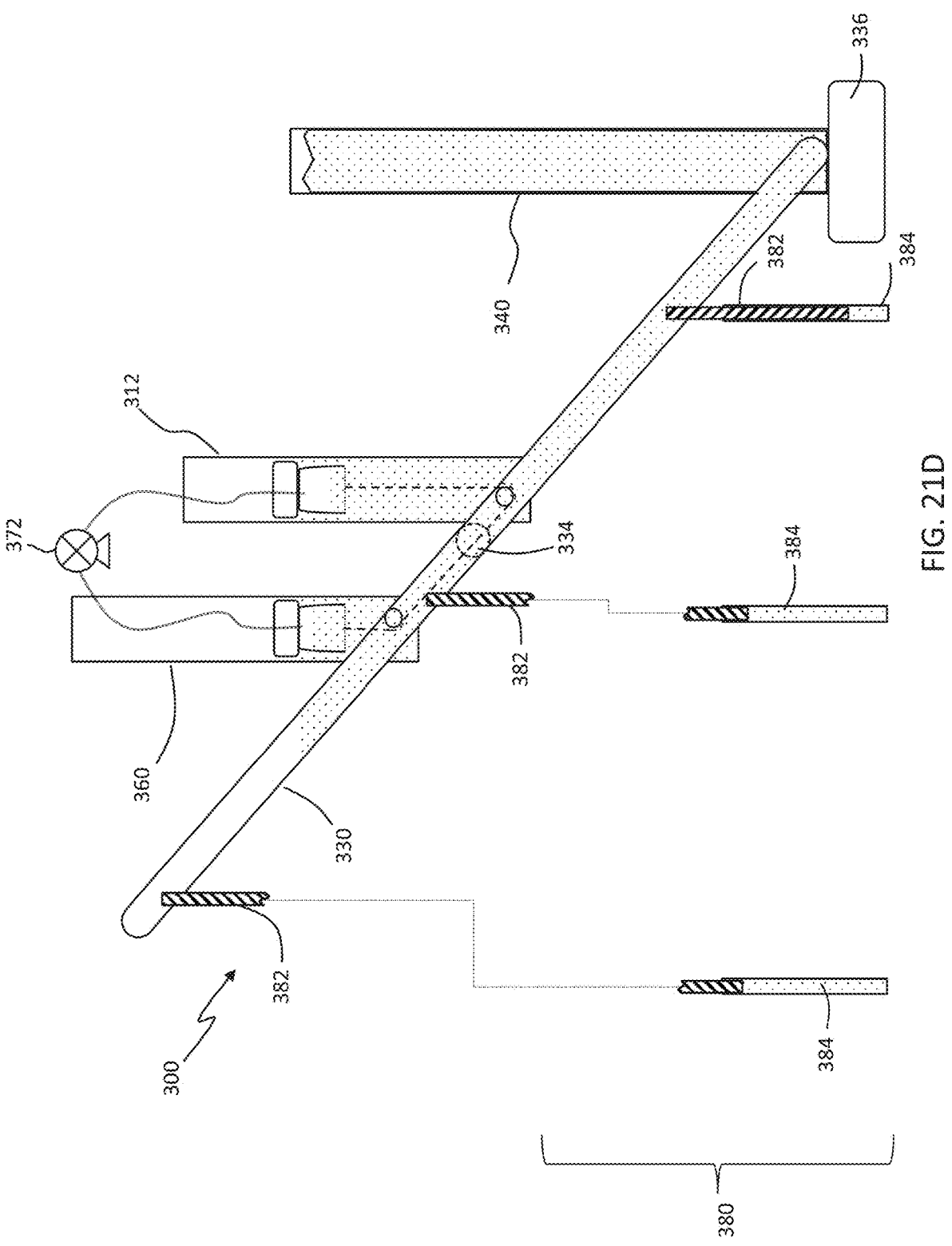
Figure 21E:
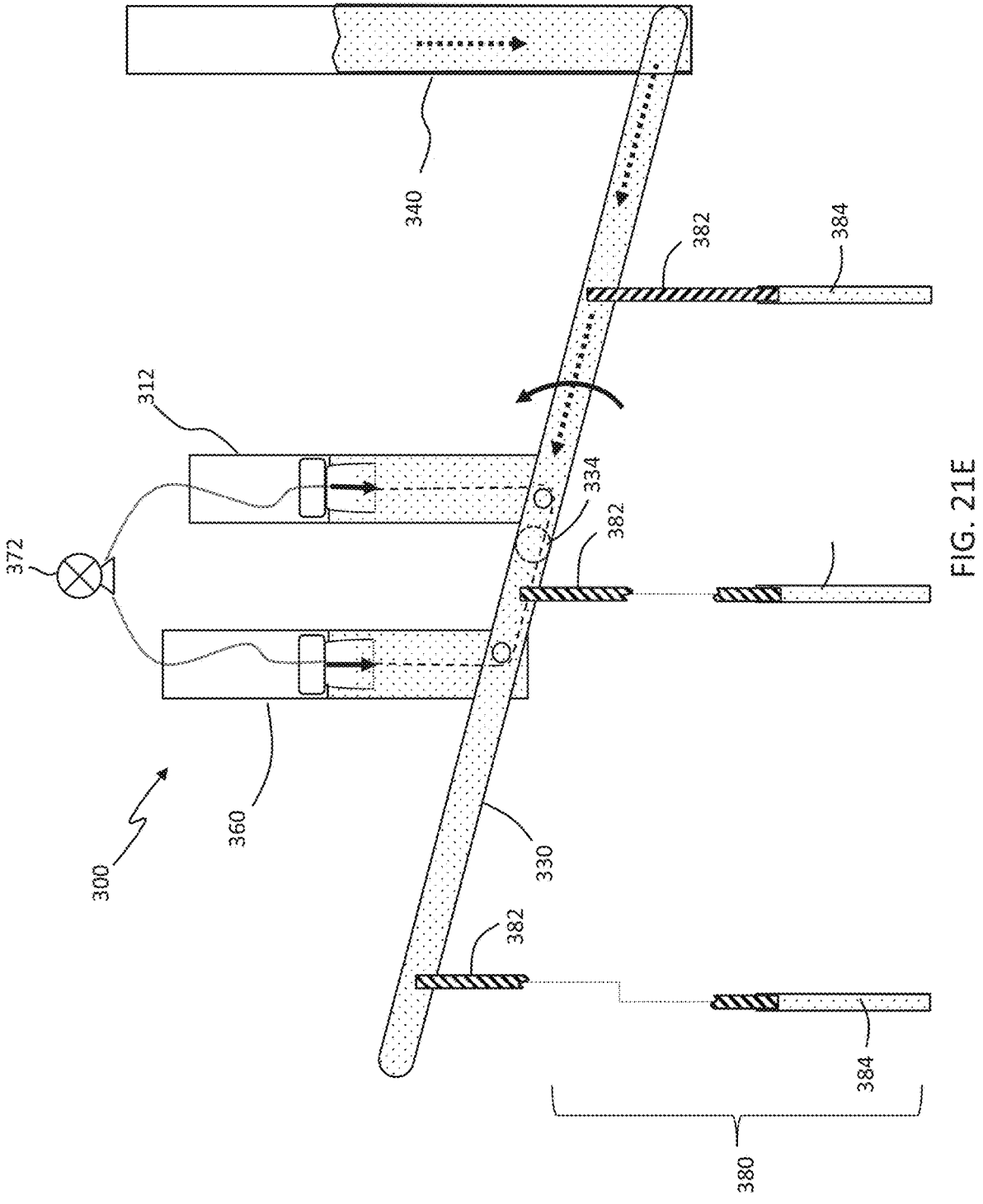

Starting at a neutral position of the system 300, depicted in FIG. 21A, air is moved into the holding tanks 320 of containers 312, 360, creating additional fluid mass in container 340. This change in mass in the balanced system exerts additional downward pressure on the end of the interconnecting lever conduit 330 causing it to rotate downward. FIG. 21C illustrates the system 300 in rotation about axis 334, based on the increase in pressure in containers 312, 360 which caused the change in mass. The rotation of the system 300 may occur until a predetermined rotational path has been achieved. For instance, the additional fluid mass may be precisely controlled to rotate the interconnecting lever conduit 330 downward until the interconnecting lever conduit 330 is stopped at the bottom of its rotation, such as at 5 o'clock position. This position is depicted in FIG. 21D. It may be possible to use a spring system 336 or similar mechanical device which slows the rotating interconnecting lever conduit 330, capturing some of its energy to be used by the system 300.

When the interconnecting lever conduit 330 is at the bottom of its rotation, air is drained from the holding tanks 320 of containers 312, 340. This release of pressure within the holding tanks 320 found in containers 312, 340 disrupts the equilibrium of the system 300, such that the fluid in container 340 seeks to move from the higher pressure of container 340 toward the lower pressure of containers 312, 360, despite the physical location of container 340 being lower than containers 312, 360, as depicted in FIG. 21D. Specifically, draining air from the holding tanks 320 of containers 312, 360 causes the fluid molecules at the bottom of the fluid column in container 340 (Vbottom), to shift back toward the bottom of the fluid columns in containers 312, 360, which causes Vadditional to disappear from the top of the fluid column of container 340, allowing the system 300 to achieve rotational balance again.

To return the system 300 to an original starting position, or another desired position, the system 300 may utilize additional features or systems to allow the interconnecting lever conduit 330 to return to a position after rotation. For example, it may be possible to use a counterweight which would be heavy enough to lift the interconnecting lever conduit 330 back to its starting position, but not so heavy as to interfere or stop Vadditional from rotating the interconnecting lever conduit 330 downward. It may also be possible to rely on draining of air out of each holding tank 320 past the point where the interconnecting lever conduit 330 is rotationally balanced, such that the end of the interconnecting lever conduit 330 would be lighter than its rotationally balanced equivalent. It is also possible to use a combination of these techniques, or additional techniques.

It may be desirable to use a technique which minimizes the energy needed to return the end of the interconnecting lever conduit 330, and container 340, back up to its staring position, to thereby preserve energy in the system 300. As discussed relative to FIGS. 19-20, the system 300 may utilize the fluid rod and tank system 380 to offset changes in mass of the fluid within containers 312, 340, 360, which may aid in returning the interconnective lever conduit 330 to a starting position.

With one or more of these techniques, the system 300 may be returned back to a neutral position, such as is shown in FIG. 21A. When the system 300 is returned to its neutral position, the additional fluid molecules that were present in container 340, quantified as Vadditional, revert back through the system 300 to achieve rotational balance. For instance, the Vadditional fluid, or an equally corresponding quantity of fluid, exit container 340, move through the fluid connection of interconnecting lever conduit 330, and into containers 312, 360. This movement of the fluid can return the system 300 back to its rotationally balanced state allowing for less Input Work to replenish the original GPE that the system 300 had before rotation, such that the system 300 is able to engage in a new cycle of motion.

Figure 21F:
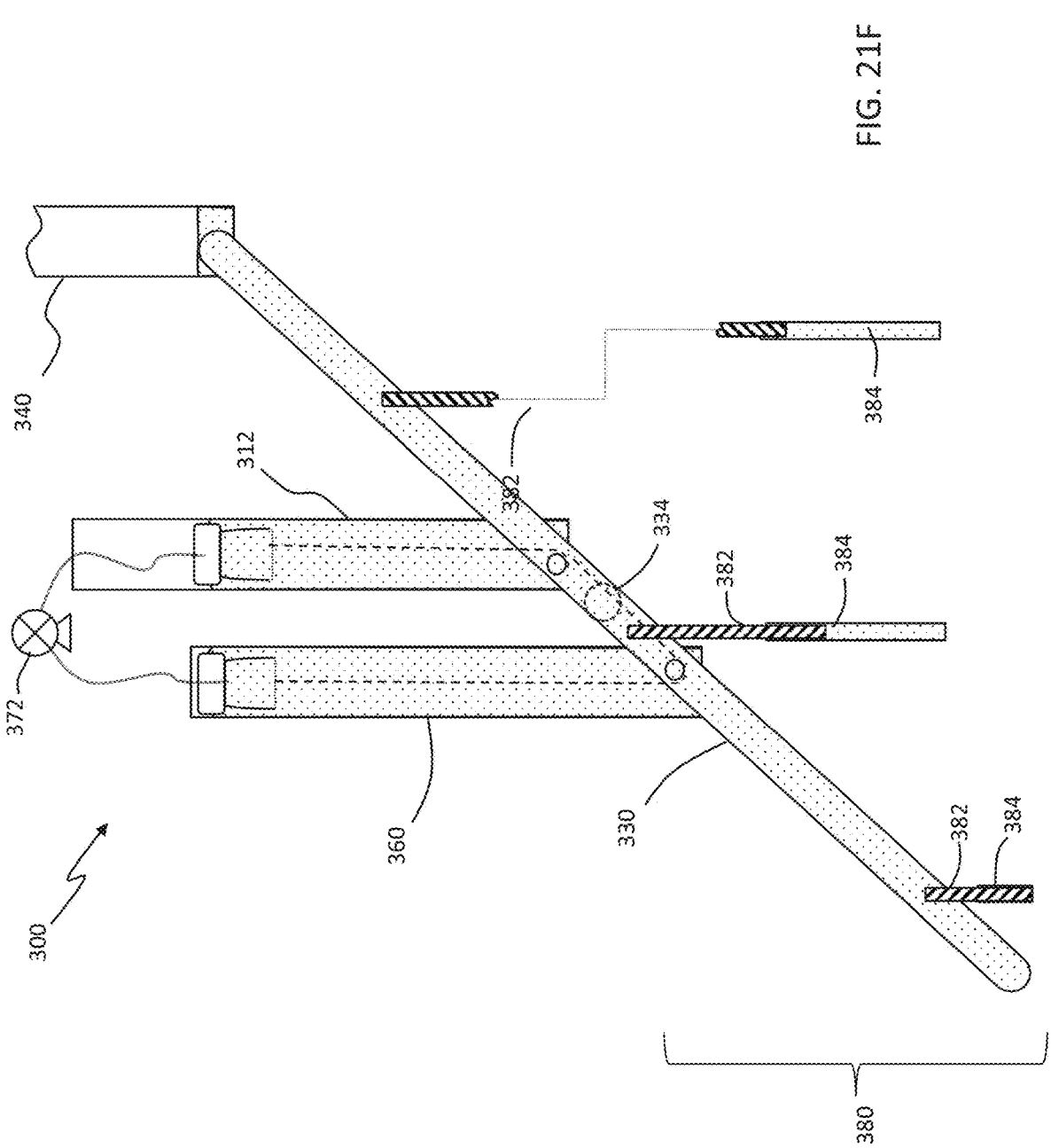

The system 300 may also move beyond the neutral position of FIG. 21A, and move to a position where the end of the interconnecting lever conduit 330 with container 340 is in a raised position. This is shown in FIG. 21F. In this position, the interconnecting lever conduit 330 with container 340 may be in approximately in the 1 o'clock position. While the cycle of the system 300 can be understood as being between any two rotational positions, it may be advantageous for the cycle of the system 300 to generally be between the 1 o'clock position of FIG. 21F and the 5 o'clock position of FIG. 21D, such that a larger range of motion is captured without substantial decreases in movement due to the interconnecting lever conduit 330 achieving a vertical, or near vertical, position.

The Work Input added to the fluid in the system 300 may be fixed for the same force as determined by the depth and where the distance is determined by the volume of the air pushed into the holding tank 320. This is true regardless of the length or angle of the interconnecting lever conduit 330, and independent of the starting fluid column heights of the containers. As the starting fluid column heights of containers 312, 340, 360 are increased, in order to create Vadditional in container 340 at a higher height above some zero point, so does the total work increase. As the starting fluid column height of container 340 increases, the total work required to lift up and fill in underneath the taller fluid column of container 340 increases, and this required additional work is supplied by the greater offsetting fluid column pressures found in the system 300, which exist because of the greater starting fluid column heights of containers 312 and 360, and not by Work Input.

In general, the GPE of Vadditional is equal to the mass of Vadditional times the height Vadditional can fall, times the force of gravity. Assuming no change in gravity, in order to increase the GPE of Vadditional, the mass must be increased, and/or the height that Vadditional can fall must be increased. To increase the amount of mass of Vadditional, one would need to increase the amount of fluid displaced in the holding tanks 320 which would increase the Work Input. But to increase the height that Vadditional can fall above some zero point, requires only an increase in the starting fluid column heights of containers 312, 340, 360. The additional work required for this increase in GPE of Vadditional is provided by the increased offsetting fluid pressure forces found in the system 300 as the fluid column heights of containers 312, 340, 360 are increased. The system 300 uses the greater gravitational potential energy of a Vadditional created at the top of a taller starting fluid column to increase the possible Work Output of the system 300. This is due to the fact that initial stored energy of the fluid molecules making up Vadditional is greater when the system 300 starts with a taller fluid column in container 340, which ultimately is used to generate the gravitational force to rotate the interconnecting lever conduit 330 a longer distance during its rotation. However, returning the system 300 back to its rotationally balanced state after a cycle of rotation minimizes the amount of energy required to lift the fluid molecules making up Vadditional back to their starting position.

To use the increased GPE in Vadditional, which was made possible by increasing the starting fluid column heights, the rotationally balanced system 300 must be reconfigured to match the height that Vadditional is created. This can be achieved by increasing the length of the interconnecting lever conduit 330 and moving container 340 to the end of the longer interconnecting lever conduit 330, and re-adjusting the balance of the structure to ensure the system 300 remains rotationally balanced before any Work Input.

Figure 22:
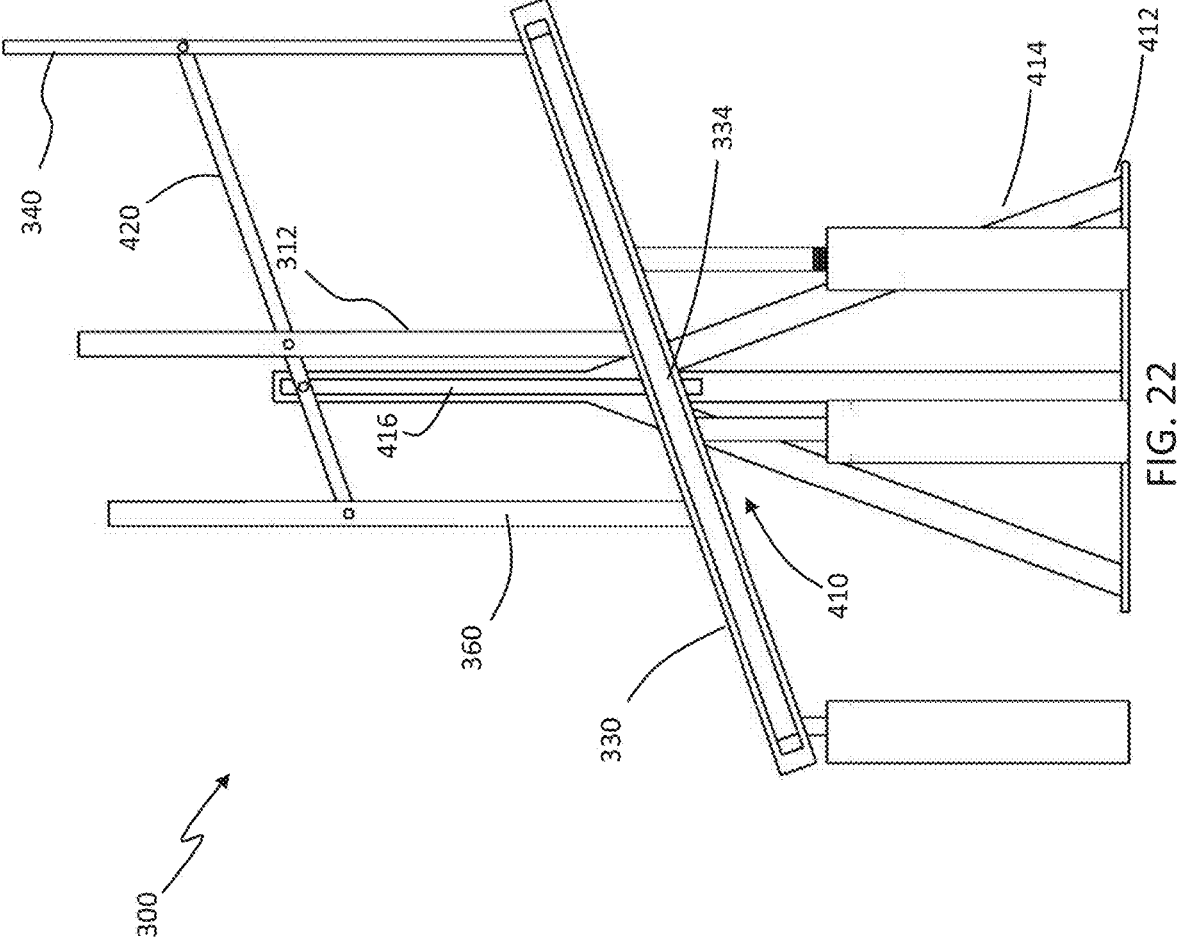
FIG. 22 is a schematic front view illustration of an engine system with three communicating fluid vessels and a fluid rod and container system, in accordance with embodiments of the present disclosure.

The engine system with communicating fluid vessels described herein may be implemented with various constructions or additional components beyond those described relative to FIGS. 12-21F. FIG. 22 is a schematic front view illustration of an engine system 300 with three communicating fluid vessels and a fluid rod and container system, in accordance with embodiments of the present disclosure, which provides on such example of a construction of the system 300. The system 300 of FIG. 22 may include many of the same features and components as discussed relative to FIGS. 12-21F which are not repeated relative to FIG. 22 for brevity in disclosure.

As shown in FIG. 22, the system 300 uses a frame 410 which holds the interconnecting lever conduit 330 a distance above a surface, such that the interconnecting lever conduit 330 can rotate without interference with the surface on which the system 300 rests. One or more linkage shafts may be used to rotatably connect the interconnecting lever conduit 330 to the frame 410. These linkage shafts may be supporting devices which carry the weight of the system 300 yet allow rotation relative to the frame 410, which is generally stationary. The frame 410 may include a base 412 contacting the resting surface, leg members 414 rising in an A-frame to an upper frame portion 416 which extends thereover.

At the upper frame portion 416, a linkage arm 420 may be pivotally connected to both the upper frame portion 416 and each of the containers 312, 340, 360 to provide stability to the containers 312, 340, 360 and aid in maintaining an upright or vertical orientation thereof. The linkage arm 420 may correspond to movement of the interconnecting lever conduit 330.

Figure 23:
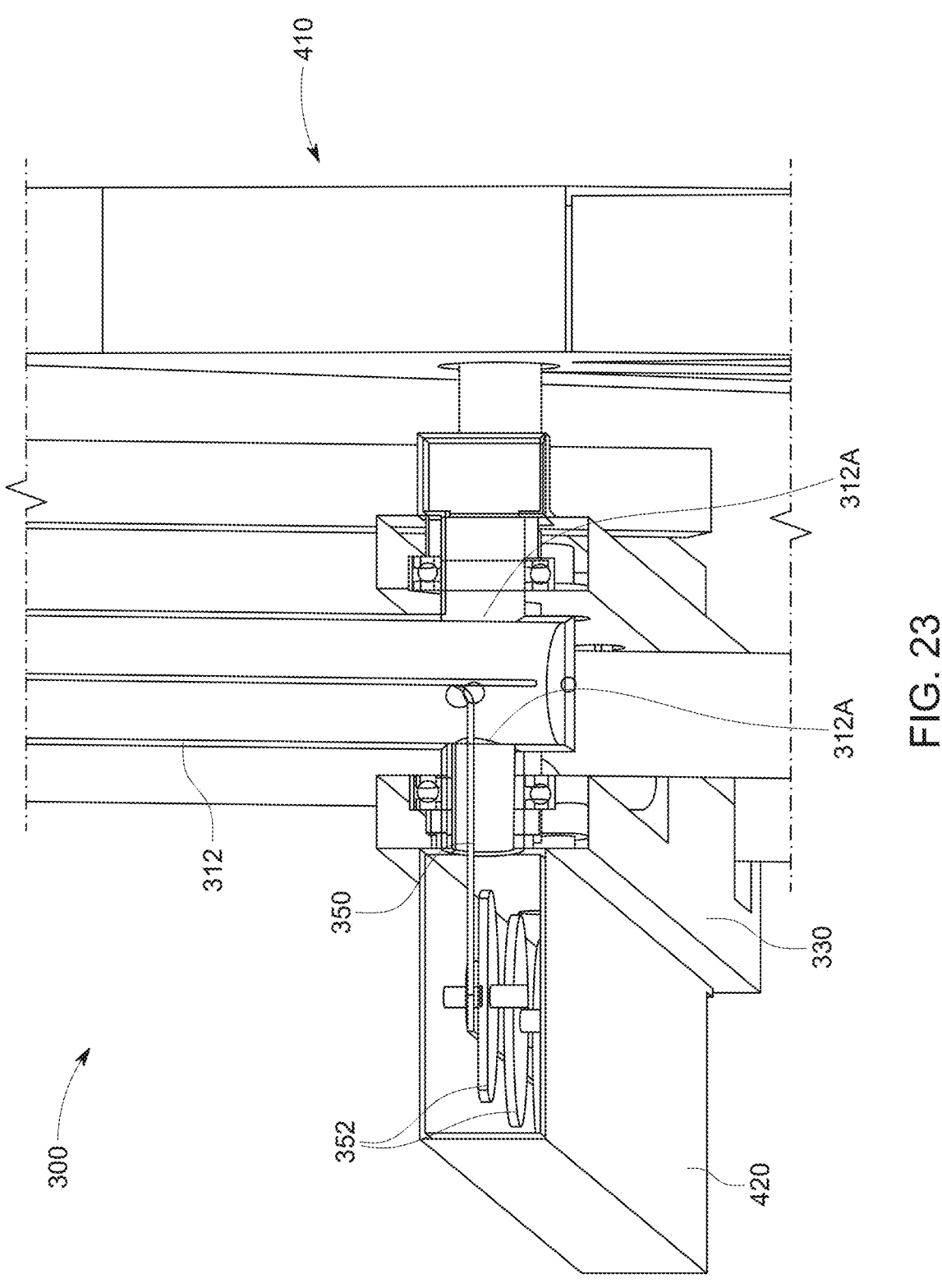
FIG. 23 is a schematic cross-sectional side view illustration of a connection between a fluid container and the interconnecting lever conduit of the engine system of FIG. 22, in accordance with embodiments of the present disclosure.

FIG. 23 is a schematic cross-sectional side view illustration of a connection between a fluid container 312 and the interconnecting lever conduit 330 of the engine system 300 of FIG. 22, in accordance with embodiments of the present disclosure. As shown, the container 312 has an open interior section which is capable of holding the fluid column, where the open interior is in fluid communication with the interconnecting lever conduit 330. For example, outlets 312A within the bottom of the container 312 may be included to allow the fluid to move from within the container 312 to the interconnecting lever conduit 330. The movement of the fluid via the interconnecting lever conduit 330 may be through an interior thereof, e.g., an interior space formed within the structure of the interconnecting lever conduit 330, or through a pipe, hose, or similar structure which is positioned in or on the interconnecting lever conduit 330.

FIG. 23 also depicts the tether 350 which extends between the interior of the container 312 and an exterior position of the container 312, such as where it moves past pulley wheels 352 of a pulley system. The pulley wheels 352 may be positioned within a tether box 420, which encases the mechanical assemblies of the pulley system. The tether box 420 can help with preventing leakage of fluid from the system 300 and help with interference with the mechanical operation of the pulley system, such as by physical interference or degradation in performance due to contamination or debris.

Figure 24:
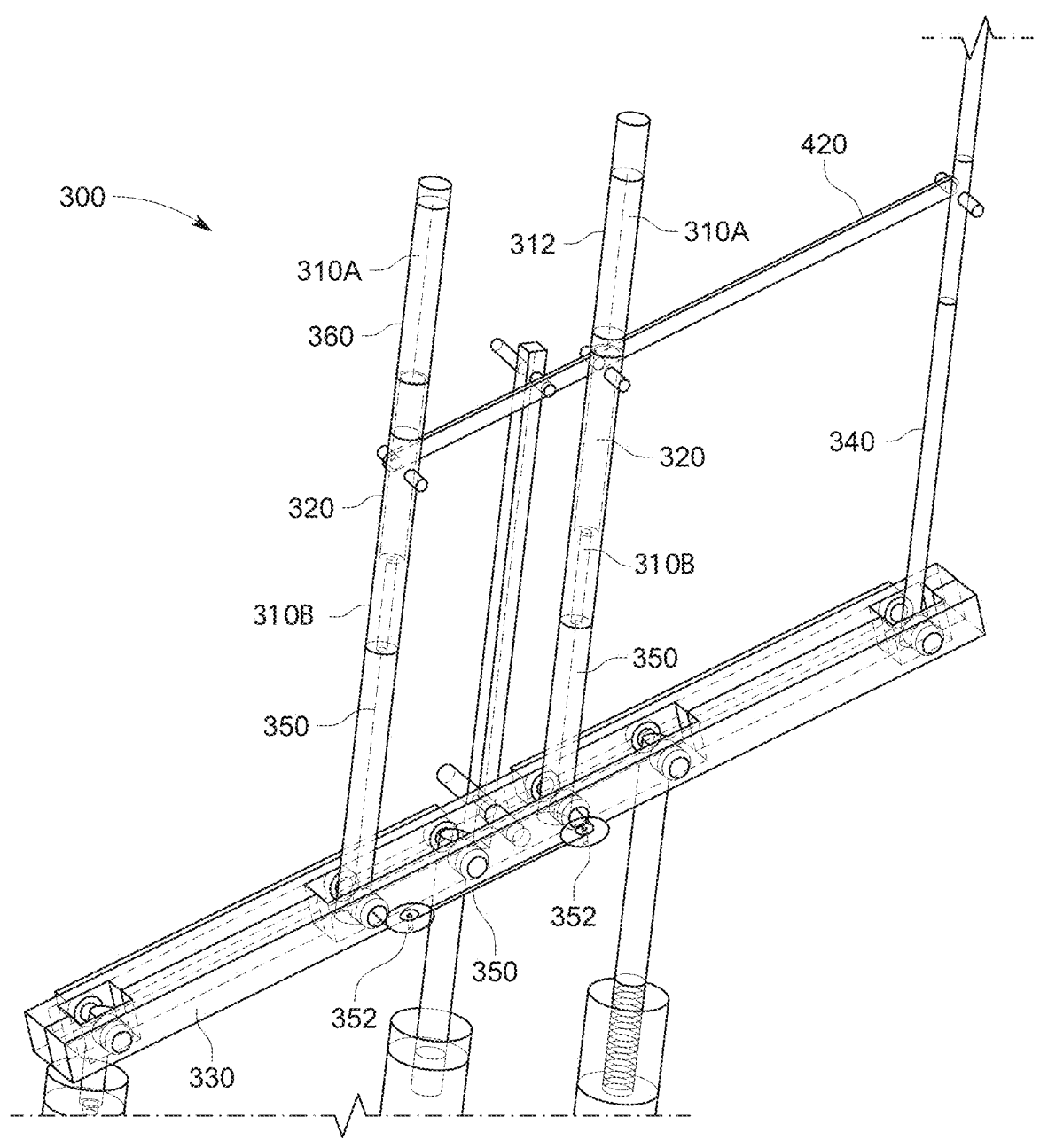
FIG. 24 is a schematic front view illustration of the engine system of FIG. 22 depicting the tether and pulley system, in accordance with embodiments of the present disclosure.

FIG. 24 is a schematic front view illustration of the engine system 300 of FIG. 22 depicting the tether and pulley system, in accordance with embodiments of the present disclosure. The frame 410 of FIGS. 23-24 is omitted for clarity. In FIG. 24, the tether 350 is shown extending from the interior of one container 312 and to the interior of another container 360. In this design, the tether extends laterally from an elongated axis of the containers 312, 360 to a pulley system which is offset from the interconnecting lever conduit 330 (the tether box is omitted from FIG. 24 for clarity).

FIG. 24 illustrates a variation on the use of the float 310 and holding tank 320 within containers 312, 360 previously discussed, in that, the system 300 of FIG. 24 uses two buoyant members. For example, an upper float 310A and a lower float 310B can be positioned on opposing ends of the fluid tank 320, with the lower float 310B having an opening allowing fluid to flow into and out of holding tank 320. In this design, the fluid tank 320 is positioned between the two floats 310A, 310B, all of which are within the water columns within the container 312, 360, respectively. The use of two floats 310A, 310B in positions along opposing ends of the holding tank 320 may help provide more controlled buoyancy of the assembly when the height of the water column changes, which in turn, can provide more precise control over fluid mass changes in the system 300.

It is noted that the subject disclosure includes methods of using an engine system with communicating fluid vessels, of which FIG. 25 is a flowchart 500 illustrating method steps, in accordance with embodiments of the present disclosure. It should be noted that any process descriptions or blocks in flow charts should be understood as representing modules, segments, portions of code, or steps that include one or more instructions for implementing specific logical functions in the process, and alternate implementations are included within the scope of the present disclosure in which functions may be executed out of order from that shown or discussed, including substantially concurrently or in reverse order, depending on the functionality involved, as would be understood by those reasonably skilled in the art of the present disclosure.

As is shown by block 502, at least one interconnecting lever conduit contains a fluid and is rotatably coupled to a first fluid container containing the fluid, a second fluid container containing the fluid, and a third fluid container containing the fluid, the at least one interconnecting lever conduit defining a fluid passageway by which the first, second, and third fluid containers are in fluid communication, and wherein the at least one interconnecting lever conduit is pivotal about an axis. A rotational balance of the interconnecting lever conduit and the first, second, and third fluid containers is changed by changing a pressure of the fluid within at least one of the first or second fluid containers (block 504). A portion of the fluid from the first or second fluid containers is shifted toward the third fluid container, thereby changing a mass of fluid within the third fluid container (block 506). The interconnecting lever conduit is rotated around the axis by an increase of torque exerted on the interconnecting lever conduit by the third fluid container (block 508). Any number of additional steps, functions, processes, or variants thereof may be included in the method, including any disclosed relative to any other figure of this disclosure.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described herein as acting in certain combinations and even initially claimed as such, one or more features from a claimed combination can in some cases be excised from the combination. and the claimed combination may be directed to a sub-combination or variation of a sub-combination. Particular embodiments of the subject matter have been described. Other embodiments are within the scope of the following claims.

What is claimed is:

1. An engine system with communicating fluid vessels, the engine system comprising:
   a first fluid container containing a fluid;
   a second fluid container containing the fluid;
   a third fluid container containing the fluid;
   at least one interconnecting lever conduit containing the fluid and rotatably coupled to the first, second, and third fluid containers, the at least one interconnecting lever conduit defining a fluid passageway by which the first, second, and third fluid containers are in fluid communication, and wherein the at least one interconnecting lever conduit is pivotal about an axis;
   at least one buoyant member positioned in each of the first and third fluid containers;
   a holding tank positioned in each of the first and third fluid containers and connected to the at least one buoyant member, the holding tank having: (i) a lower portion configured to allow the fluid to pass into and out of an interior of the holding tank and (ii) an upper portion that is fluidly sealed;

a tether physically linking together the holding tank of each of the first and third fluid containers; and a supply of a gas that is in fluid communication with the interior of at least one of the holding tanks in the first or third fluid containers, wherein supplying the gas to the interior of the holding tank displaces at least some of the fluid from the interior of the holding tank to increase a column height of the fluid in each of the first, second, and third fluid containers.

2. The engine system of claim 1, wherein, as the fluid is displaced from the interior of the holding tank, a mass of the fluid in the second fluid container increases, wherein the at least one interconnecting lever conduit pivots about the axis.

3. The engine system of claim 2, wherein the increased mass of the fluid in the second fluid container increases a torque exerted on the at least one interconnecting lever conduit by the second fluid container.

4. The engine system of claim 3, further comprising an electrical generator, and wherein the torque drives rotations of the electrical generator.

5. The engine system of claim 1, wherein the second fluid container is positioned proximate to a terminating end of the at least one interconnecting lever conduit.

6. The engine system of claim 1, further comprising at least one fluid rod and tank system having at least one fluid rod suspended from the at least one interconnecting lever conduit, and a corresponding tank positioned below the at least one fluid rod, wherein the corresponding tank has a fluid therein, and wherein pivotal movement of the at least one interconnecting lever conduit causes the at least one fluid rod to move relative to the fluid in the corresponding tank.

7. The engine system of claim 6, wherein the fluid in the corresponding tank and the fluid rod have the same density.

8. The engine system of claim 1, further comprising at least one pulley wheel contacting the tether, wherein a direction of movement of the tether changes around the at least one pulley wheel.

9. The engine system of claim 1, wherein the supply of the gas is an air compressor.

10. The engine system of claim 1, wherein the first fluid container is positioned between the axis and the second fluid container.

11. The engine system of claim 1, wherein the first fluid container is positioned on an opposing side of the axis from the third fluid container.

12. The engine system of claim 1, wherein the at least one buoyant member positioned in each of the first and third fluid containers further comprises at least two buoyant members positioned in each of the first and third fluid containers, wherein the holding tank of each of the first and third fluid containers is positioned between the at least two buoyant members.

13. The engine system of claim 1, wherein displacing fluid from the interior of the holding tank to increase the column height of the fluid in each of the first, second, and third fluid containers generates a gravitational potential energy (GPE) difference between at least two of the first, second, and third fluid containers, wherein the GPE difference generates an energy output which is output from the engine system.

14. An engine system with communicating fluid vessels, the engine system comprising:

an output shaft; and two or more engines that each comprise:

a first fluid container containing a fluid;

a second fluid container containing the fluid;

a third fluid container containing the fluid;

at least one interconnecting lever conduit containing the fluid and rotatably coupled to the first, second, and third fluid containers, the at least one interconnecting lever conduit defining a fluid passageway by which the first, second, and third fluid containers are in fluid communication, and wherein the at least one interconnecting lever conduit is pivotal about an axis;

at least one buoyant member positioned in each of the first and third fluid containers;

a holding tank positioned in each of the first and third fluid containers and connected to the at least one buoyant member, the holding tank having: (i) a lower portion configured to allow the fluid to pass into and out of an interior of the holding tank and (ii) an upper portion that is fluidly sealed;

a tether physically linking together the holding tank of each of the first and third fluid containers; and a supply of a gas that is in fluid communication with the interior of at least one of the holding tanks in the first or third fluid containers, wherein supplying the gas to the interior of the at least one of the holding tanks displaces at least some of the fluid from the interior of the at least one of the holding tanks to increase a column height of the fluid in each of the first, second, and third fluid containers wherein the two or more engines are each coupled to and drive rotations of the output shaft.

15. The engine system of claim 14, wherein, as the fluid is displaced from the interior of the at least one of the holding tanks, a mass of the fluid in the second fluid container increases, wherein the at least one interconnecting lever conduit pivots about the axis.

16. The engine system of claim 15, wherein the increased mass of the fluid in the second fluid container increases a torque exerted on the at least one interconnecting lever conduit by the second fluid container.

17. The engine system of claim 16, further comprising an electrical generator, and wherein the torque drives rotations of the electrical generator.

18. The engine system of claim 14, wherein the second fluid container is positioned proximate to a terminating end of the at least one interconnecting lever conduit.

19. The engine system of claim 14, wherein each of the two or more engines further comprises at least one fluid rod and tank system having at least one fluid rod suspended from the at least one interconnecting lever conduit, and a corresponding tank positioned below the at least one fluid rod, wherein the corresponding tank has a fluid therein, and wherein pivotal movement of the at least one interconnecting lever conduit causes the at least one fluid rod to move relative to the fluid in the corresponding tank.

20. The engine system of claim 19, wherein the fluid in the corresponding tank and the fluid rod have the same density.

21. The engine system of claim 14, wherein each of the two or more engines further comprises at least one pulley wheel contacting the tether, wherein a direction of movement of the tether changes around the at least one pulley wheel.

22. The engine system of claim 14, wherein the supply of the gas is an air compressor.

23. The engine system of claim 14, wherein the first fluid container is positioned between the axis and the second fluid container.

24. The engine system of claim 14, wherein the first fluid container is positioned on an opposing side of the axis from the third fluid container.

25. The engine system of claim 14, wherein the at least one buoyant member positioned in each of the first and third fluid containers further comprises at least two buoyant members positioned in each of the first and third fluid containers, wherein the holding tank of each of the first and third fluid containers is positioned between the at least two buoyant members.

26. A method using an engine system with communicating fluid vessels, the method comprising:

providing at least one interconnecting lever conduit containing a liquid fluid and rotatably coupled to a first fluid container containing the liquid fluid, a second fluid container containing the liquid fluid, and a third fluid container containing the liquid fluid, the at least one interconnecting lever conduit defining a liquid fluid passageway by which the first, second, and third fluid containers are in liquid fluid communication, and wherein the at least one interconnecting lever conduit is pivotal about an axis;

changing a rotational balance of the at least one interconnecting lever conduit and the first, second, and third fluid containers by changing a pressure of the liquid fluid within at least one of the first or third fluid containers;

transferring, through the liquid fluid passageway of the at least one interconnecting lever conduit, a portion of the liquid fluid from the first or third fluid containers to the second fluid container, thereby changing a mass of liquid fluid within the second fluid container; and rotating the at least one interconnecting lever conduit around the axis by an increase of torque exerted on the at least one interconnecting lever conduit by the second fluid container.

27. The method of claim 26, further comprising driving rotations of an electrical generator with the rotating the at least one interconnecting lever conduit.

28. The method of claim 26, wherein the second fluid container is positioned proximate to a terminating end of the at least one interconnecting lever conduit.

29. The method of claim 26, wherein the first fluid container is positioned between the axis and the second fluid container.

30. The method of claim 26, wherein the first fluid container is positioned on an opposing side of the axis from the third fluid container.

31. The method of claim 26, further comprising:

at least one buoyant member positioned in each of the first and third fluid containers;

a holding tank positioned in each of the first and third fluid containers and connected to the at least one buoyant member, the holding tank having: (i) a lower portion configured to allow the liquid fluid to pass into and out of an interior of the holding tank and (ii) an upper portion that is fluidly sealed;

a tether physically linking together the holding tank of each of the first and third fluid containers; and a supply of a gas that is in fluid communication with the interior of at least one of the holding tanks in the first or third fluid containers, wherein supplying the gas to the interior of the at least one of the holding tanks displaces at least some of the liquid fluid from the interior of the at least one of the holding tanks to increase a column height of the liquid fluid in each of the first, second, and third fluid containers.

32. The method of claim 31, further comprising at least one pulley wheel contacting the tether, wherein a direction of movement of the tether changes around the at least one pulley wheel.

33. The method of claim 31, wherein the supply of the gas is an air compressor.

34. The method of claim 31, wherein the at least one buoyant member positioned in each of the first and third fluid containers further comprises at least two buoyant members positioned in each of the first and third fluid containers, wherein the holding tank of each of the first and third fluid containers is positioned between the at least two buoyant members.

35. The method of claim 26, further comprising at least one fluid rod and tank system having at least one fluid rod suspended from the at least one interconnecting lever conduit, and a corresponding tank positioned below the at least one fluid rod, wherein the corresponding tank has a fluid therein, and wherein pivotal movement of the at least one interconnecting lever conduit causes the at least one fluid rod to move relative to the fluid in the corresponding tank.

36. The method of claim 35, wherein the fluid in the corresponding tank and the fluid rod have the same density.

* * * * *